United States Patent [19]
Gill et al.

[11] Patent Number: 6,052,514
[45] Date of Patent: Apr. 18, 2000

[54] DISTRIBUTED PUBLICATION SYSTEM WITH SIMULTANEOUS SEPARATE ACCESS TO PUBLICATION DATA AND PUBLICATION STATUS INFORMATION

[75] Inventors: Timothy E. Gill; Brian R. Bucknam; Julie L. Sander, all of Denver; John D. Williams, III, Highlands Ranch, all of Colo.

[73] Assignee: Quark, Inc., Denver, Colo.

[21] Appl. No.: 08/375,163

[22] Filed: Jan. 18, 1995

Related U.S. Application Data

[63] Continuation of application No. 07/955,312, Oct. 1, 1992, abandoned.

[51] Int. Cl.[7] .................................................. G06F 17/30
[52] U.S. Cl. .................... 395/331; 395/761; 395/763; 395/777; 395/779; 395/329; 395/342
[58] Field of Search .......................... 395/600, 144–149, 395/153, 331, 329, 761, 763, 777, 779

[56] References Cited

U.S. PATENT DOCUMENTS

| | | | |
|---|---|---|---|
| 3,668,685 | 6/1972 | Horvath | 345/156 |
| 4,949,287 | 8/1990 | Yamaguchi et al. | 395/782 |
| 4,951,233 | 8/1990 | Fujiwara et al. | 395/787 |
| 5,008,853 | 4/1991 | Bly et al. | 395/331 |
| 5,031,121 | 7/1991 | Iwai et al. | 395/777 |
| 5,063,495 | 11/1991 | Macphail | 395/761 |
| 5,089,956 | 2/1992 | MacPhail | 395/601 |
| 5,133,051 | 7/1992 | Handley | 395/776 |
| 5,140,676 | 8/1992 | Langelaan | 395/777 |
| 5,181,162 | 1/1993 | Smith et al. | 395/792 |
| 5,214,755 | 5/1993 | Mason | 395/782 |
| 5,226,143 | 7/1993 | Baird et al. | 395/412 |
| 5,251,315 | 10/1993 | Wang | 395/608 |
| 5,337,407 | 8/1994 | Bates et al. | 395/331 |
| 5,481,663 | 1/1996 | Satake | 395/781 |

FOREIGN PATENT DOCUMENTS

0444669A2  2/1991  European Pat. Off. ........ G06F 17/30

OTHER PUBLICATIONS

Microsoft Word For Window's User's Reference, Microsoft Corporation, 1989, pp. 140, 241–260, 388–390, 399–400.

*Primary Examiner*—Thomas G. Black
*Assistant Examiner*—Hosain T. Alam
*Attorney, Agent, or Firm*—Duft, Graziano & Forest, P.C.

[57] ABSTRACT

A publication system is disclosed for coordinating access to publication data and related information. The publication data typically includes text, image data and layout data. The related information is stored in an item header file, as well as in a number of records. The system includes a network of computers including computers dedicated to performing certain tasks related to obtaining publication data and such related information. To coordinate the publication process, the ability to modify text contained in an item file is limited while certain of the records that include useful information related to the same item file are separately available for other network users. The system also generates watch records to notify users of the current status of, availability of, or to provide other information related to, a publication item of interest. Algorithms are also disclosed for facilitating the writing and editing of text for an article.

20 Claims, 16 Drawing Sheets

DISTRIBUTED PUBLICATION SYSTEM WITH SIMULTANEOUS SEPARATE ACCESS TO PUBLICATION DATA AND PUBLICATION STATUS INFORMATION

This application is a file wrapper continuation, of application Ser. No. 07/955,312, filed Oct. 1, 1992 now abandoned.

FIELD OF THE INVENTION

The present invention relates to a publication system and, in particular, to coordinating and managing task assignments associated with publishing an item having text, image data and/or layout data.

BACKGROUND OF THE INVENTION

In the magazine and newspaper publishing industry, publications are typically labor-intensive requiring substantial effort and coordination from, among others, writers, editors, layout designers, art directors and publication managers. The managers direct the focus of the publication and coordinate the publication process to assure deadlines are met. The layout designers and art directors are concerned with the presentation of the publication, for instance, page organization or layout and image or art content. Alternatively, the writers and editors are primarily concerned with the textual content of the publication. In the effort to meet a deadline, each publication page can undergo numerous revisions from any of the above mentioned groups. Since many such revisions impact the work products of other groups, the revisions must not only be done timely but also must be communicated and coordinated with other work groups. Thus, for example, if the layout designers change a page layout such that the space for the text of an article decreases, then either the editor or writer responsible should be informed so that the article can be modified to fit the new allocated area. Therefore, it is desirable to automate such publication processes so that both greater productivity gains can be realized and, in addition, workers have tools more adapted to the work products produced in the publication industry.

In U.S. Pat. No. 4,949,287 issued to Yamaguchi et al., an electronic document processing system is disclosed for laying out text and image data for a document. The system allows the specification of layout attribute data restricting the location of image data to designated areas within the document. The system also allows image data to be associated with a portion of the document text referring to the image. Thus, page layouts are generated in accordance with the image inhibition attributes such that each image and any related text are in proximity to one another.

In U.S. Pat. No. 3,668,685 issued to Horvath, a publication processing system is disclosed. The system allows various publication departments to input publication data into the system via terminals and scanners. In addition, a layout terminal is disclosed allowing layout designers to create and electronically store layouts of publication pages. The system allows the layout designers to assign publication items to page areas and, optionally, to enter item identifying information which the layout terminal can visually display for indicating where the items are to be placed on the page.

Regardless of the above mentioned prior art, it would be advantageous to further automate the publication process. In particular, it would be advantageous to automate the workflow coordination and communication process as well as supply individual workers with further tools specifically designed for the publication industry.

SUMMARY OF THE INVENTION

In accordance with the present invention, a publication system is disclosed that includes a publication coordinator involved in managing and coordinating, among a number of users utilizing a computer network, access to publication information and publication data related to items for publication. The publication data can include text, image data and/or layout data for a particular publication item. The publication coordinator includes a file server for retrieving and storing publication data from memory. Each item for publication has a file associated therewith with the file including an item file header that provides predetermined publication related information about the contents of the particular item file, a content area having the text or image data of an item and a geometry area related to the location, orientation and shape of the layout area for the particular item for publication. In one embodiment, the file server is associated with one dedicated computer of the computer network. The publication coordinator also includes a data controller that controls publication data transfers relative to the file server and its associated memory by means of a predetermined utility. Such utilities include, for example, publication item file check-in and check-out utilities whereby a user of the computer network is able to store or retrieve, respectively, a particular item file. In one embodiment, the data controller resides on a dedicated computer of the computer network that is different from the dedicated computer associated with the file server. The data controller is additionally involved with utilities that provide notifications to users and answer queries of users related to a particular publication item file or collection of publication item files such as a change in the status or the contents of the particular publication item file(s).

More specifically, a number of data stores communicate with the data controller for storing predetermined data records primarily containing publication information related to the publication items. These data records include item header records. Each of the item header records is a copy of the item file header associated with a particular publication item. These records are used by a publication item controller of the data controller in granting access to the corresponding publication item file that is accessible using the afore-noted file server. Each item header record includes information such as a check-out name field that identifies the user that has the particular publication item file checked-out for exclusive use, a status of the publication item and a deadline date associated with the publication item, as well as other predetermined useful information.

The publication item controller also communicates with item summary records. As with the item header records, each publication item has an item summary record associated with it. Each of these summary records includes information such as a field for storing the identity of the user that currently has exclusive use for modification of the item header record, another field that indicates how the item header record and item file header are being used and a reference field related to identification of users waiting for access to the particular publication item file that corresponds to the summary record. The data controller is able to provide access to the item header record and the item summary record, for a particular publication item file, to two different users at the same time, while yet another user is able to access the publication item file that is associated with these two records.

The data stores associated with the data controller also have watch records that are maintained by a notification controller of the data controller. The notification controller determines whether a file notification should be provided whereby the notification is due to one of a number of predetermined changes occurring to a publication item or whether a query notification should be provided whereby the notification is due to a change in an item header record triggering the evaluation of a query expression related to fields of the item header record. For example, the notification controller provides a requester with the ability to be automatically notified when an event occurs, such as a publication item file being checked-out for editing. With respect to a query notification, the data controller also includes a query evaluator that is used in evaluating and re-evaluating publication item queries for automatically notifying a requester when the response to the query changes as a result of a predetermined event. With respect to the watch records themselves, each includes file notification or query notification related information, such as the identity of the predetermined event that initiated a file notification, a reference field that refers to a query expression evaluated when a query notification is initiated, a user identification field for storing the identification of the user requesting notification upon the occurrence of one or more predetermined events and a reference field that links together a number of watch records relating to providing notification on the occurrence of one or more predetermined events associated with a particular publication item file. Hence, as one or more users are accessing, modifying or otherwise using a particular publication item file and the related or corresponding item header and item summary records, other users are notified or can be provided with information related to that particular publication item file by means of watch records directed to such a file.

The publication system also includes an article text editing unit that is accessible by a user on the network and, if the user is authorized, the user is able to obtain an article associated with a particular publication item file for modifying or editing the text thereof. Because the system grants exclusive use of the article text, via the check-out utility, to a single user for modification of the text, other users are prevented from gaining access to the text of the same article. However, users other than the exclusive user for text modification purposes are able to concurrently view the unedited state of the text. With respect to text editing, the article text editing unit includes a dynamic fit analysis unit for providing the user with information related to available and occupied space for the article. In particular, each desktop publishing device for article editing on the computer network includes a display having sections for indicating a number of metrics or statistics relating to the fitting of text within the layout areas assigned to the article. In particular, the number of lines or depth that remain available for article text can be displayed. Based on this information, the user is able to determine the amount of additional text that is required to complete the article or whether the text provided during the editing operation exceeds the space allocated for the article text. This information is updated and displayed automatically on a dynamic basis whenever there is a user pause in the entering of text editing operations performed in connection with the article. In one embodiment, each time another character of a word of the article is inputted or changed, a determination is automatically made and displayed as to whether the text is now "under" or "over" the amount of space allocated for the article text. The article text editing unit also includes a display formatter that enables the user to select a desired one of three different text formats for display. These formats include WYSIWYG, Galley and full screen.

In addition to text editing management, the publication system also includes software for assigning articles and creating desired article file arrangements. Specifically, an authorized user has the option to include for sending to the writer of a particular article one or all page pictures for displaying the other publication items on the same page(s) as those associated with the article. The page picture or pictures can be useful to the writer or editor in preparing the text for the assigned article. With respect to creating page pictures during article file creation, for each page of the article for which a page picture is to be created, a blank page picture is first created. Subsequently, for each of the one or more layout areas on a page for which a page picture is to be constructed, if the layout area is to contain text of the assigned article, then blanks are drawn into the layout area of the page picture that corresponds to this particular layout area. On the other hand, for layout areas not destined to contain text for the assigned article, the contents of the layout area are drawn into the corresponding page area. Thus, a layout area containing, for example, image data, and residing on a page for which a page picture is to be created, will appear on the page picture exactly as it will appear on the page when published. Additionally, for each page containing a portion of the assigned article, the geometry of the article is also obtained and provided with the article file for subsequent storage using the data controller. By this technique, a user is better able to visualize and utilize information related to the location of article text and the location of publication data other than text.

Based on the foregoing summary, a number of salient features of the present invention are readily discerned. A system is provided that has a number of different data bases for storing publication data and information related to such publication data so that more than one user is able to simultaneously obtain necessary information for a particular item to be published. As a consequence, a number of different users involved in the publishing of a particular item, including managers, writers, editors and layout persons, can be working on the same publication item at the same time without interference. Relatedly, the system includes records and control for providing notification information and query responses related to the status and/or modification of any selected one or a number of publication item files, together with data and information related thereto such as that found in publication item records. Because such notifications or query responses can be automatically provided, updates are timely received and users have greater certainty concerning the accuracy of relevant information for each publication item. The present invention also permits users to select a desired one of a number of different text display formats. In addition, information related to available space for article text is also updated automatically so that the user need not guess as to the remaining available space and this dynamically displayed information also saves the user time in not having to take additional steps in connection with determining whether the allocated space for text has been exceeded.

Additional advantages of the present invention will become readily apparent from the following discussion, particularly when taken together with the accompanying drawings.

DETAILED DESCRIPTION OF THE PREFERRED EMBODIMENT

Figure 1:
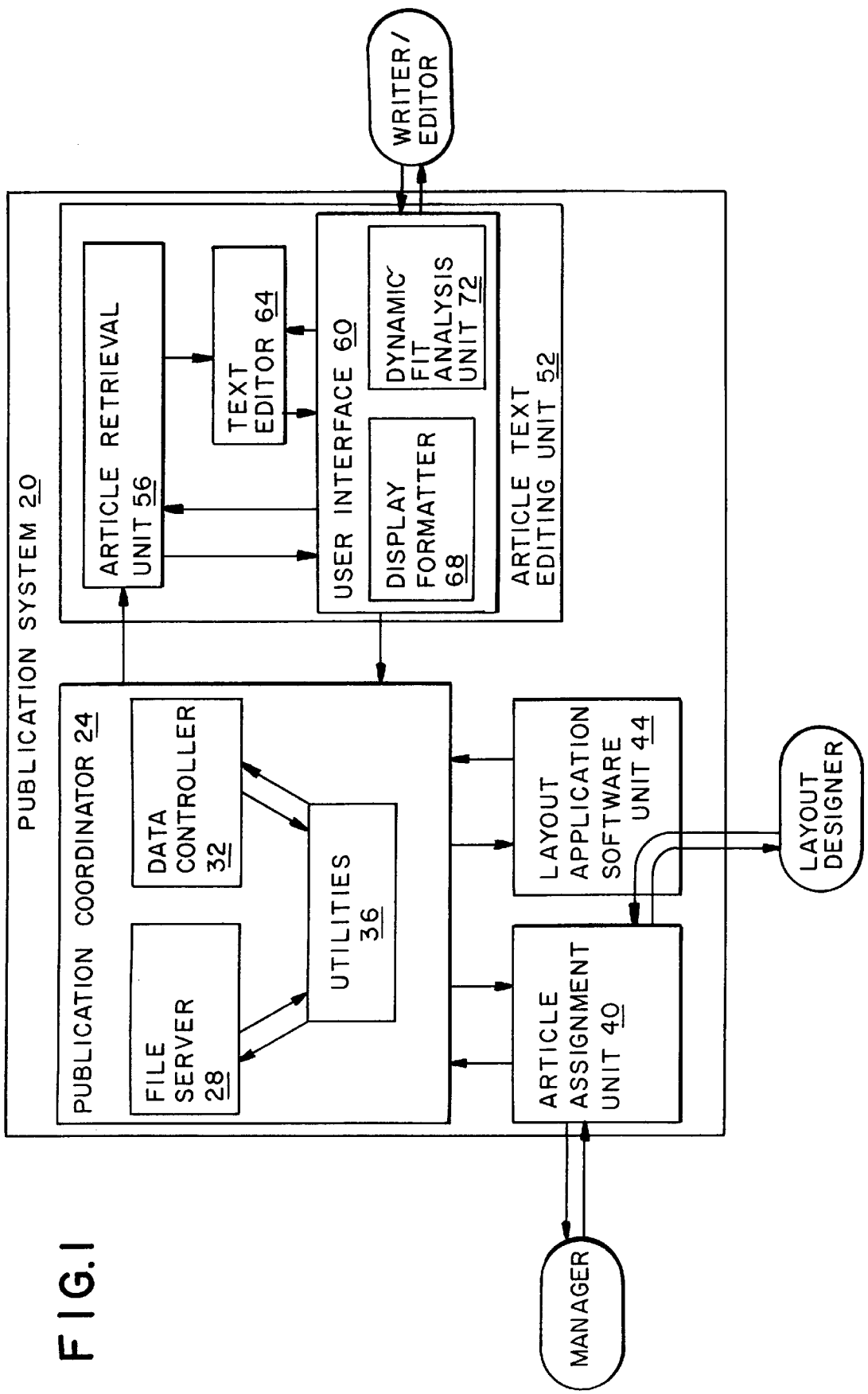
FIG. 1 presents a high level block diagram of the publication system 20.

Referring to FIG. 1, a block diagram representing the major components of the automated publication system 20 of the present invention is illustrated. The publication system 20 includes a publication coordinator 24 for coordinating the workflow between individuals and groups responsible for various portions of a publication effort. In particular, the publication coordinator 24 facilitates the management and communication of work products between workers or users by providing a centralized repository for all publication items (e.g., articles, images and layouts) such that access to these items are coordinated through a check-in/check-out mechanism in combination with a notification mechanism for notifying users of publication changes that can affect their work products. The publication coordinator 24 includes a file server 28, a data controller 32 and a collection of utility programs 36. The file server 28 provides access to all persistent file storage for communally accessed publication items. The data controller 32 controls the access to all publication item files (e.g., article files, image files and layout files) residing on the file server 28. In addition, the data controller 32 also provides users with publication item description information (known as a "file notification") and provides the notification mechanism which includes both a capability for automatically notifying users of changes to a specific publication item file and a capability (known as a "query notification") allowing users to establish queries for publication item changes of which they wish to be notified. The collection of utilities 36 provide the high level functionality of the publication coordinator 24 such that the publication coordinator 24 can be viewed as a data server of a client-server software architecture paradigm. Thus, software processes requesting publication coordinator 32 services are considered "client applications" who make requests of the publication coordinator 24 via the utility programs 36. Thus, the utilities 36:

(1.1) communicate with the data controller 32 in controlling access to publication item file(s) supplied by the file server 28 and in providing user client applications with an interface to receive notification of publication changes;

(1.2) communicate with the file server 28 to read and write publication item files; and (1.3) transfer publication item information to/from users via the client applications the users are executing.

Thus, for example, a client application such as the layout application, QUARKXPRESS, by Quark Incorporated, can use a check-in and check-out pair of utilities to control access to publication layout files such that the exclusive right to modify such a file is only granted by checking-out the file from the publication coordinator 24 and the right to modify is only released by checking-in the file to the publication coordinator 24.

The publication system 20 also includes at least the following client applications: a layout application software unit 44, an article assignment unit 40, and an article text editing unit 52. The layout application software unit 44 can be any publication layout application which can properly communicate with the other software programs of the publication system 20. However, preferably the layout application software unit 44 is QUARKXPRESS. The article assignment unit 40 allows an assignor (preferably a layout designer or a manager) to assign an article to a writer/editor or change various assignment attributes such as due date and due time. Preferably, when a layout designer assigns an article, it is via a user interface integrated and/or compatible with the layout application software unit 44 such that the designer can optionally send a bit map(s) of the page(s) within which the newly assigned article is to reside.

With regard to the article text editing unit 52, it is used for creating and modifying the text of an article. The article text editing unit 52, in turn, includes an article retrieval unit 56, a user interface 60 and a text editor 64. The article retrieval unit 56 retrieves, and optionally checks-out for exclusive use, articles from the publication coordinator 24. In addition, the article retrieval unit 56 issues requests to display each retrieved article, via the user interface 60, to the writer/editor. To accomplish this, article request information flows from the writer/editor to the user interface 60 and on to the article retrieval unit 56 for article retrieval from the publication coordinator 24. Once the article is retrieved, display options are set and the article is presented to the user interface 60 to be displayed. The article retrieval unit 56 is also connected to the text editor 64 for optionally supplying the article text for editing. The text editor 64 is an interactive text editor that is compatible with displaying text in a plurality of formats. The text editor 64 is connected to the user interface 60 for receiving editing commands entered by the writer/editor. Alternatively, the text editor sends any text modifications to the user interface 60 for display to the writer/editor. In addition to displaying the article to the writer/editor, the user interface 60 also, at the request of the writer/editor, can check-in a modified version of a previously checked-out article file to the publication coordinator 24. The user interface 60, in turn, includes two components of particular importance, that is, the display formatter 68 and the dynamic fit analysis unit 72. The display formatter 68 provides the writer/editor with the capability to view an article in any one of a plurality of formats. At least the following formats are supported:

(2.1) a "WYSIWYG" (i.e., What You See Is What You Get) format whereby the writer/editor can view the article in exactly the same context as it is laid out for publication with any surrounding pictures and additional text on the page(s) containing the article;

(2.2) a Galley format whereby the text lines are terminated in the same places as in the actual publication and in addition, each line has a line number preceding it for identification purposes. However, no other portions of the publication context are shown; and (2.3) a full screen format whereby the text of the article is displayed with lines of text as long as can be fitted across the width of the text article display window. Thus, no line formatting or context from the publication layout is used in this format.

As for the dynamic fit analysis unit 72, this unit provides the writer/editor with the ability to display, dynamically as the text is being entered, statistics or metrics regarding the article. Preferably, at least the following statistics are dynamically computed:

(3.1) the total number of words in the article;

(3.2) the total number of lines in the article as the article would appear in the publication;

(3.3) the total length or depth of the article as the article would appear in the publication, preferably in inches or centimeters; and (3.4) a depth "under/over" statistic whereby the difference between the depth (alternatively, number of lines) of the article's assigned publication area and the article's current depth (alternatively, number of lines) is displayed.

Figure 2:
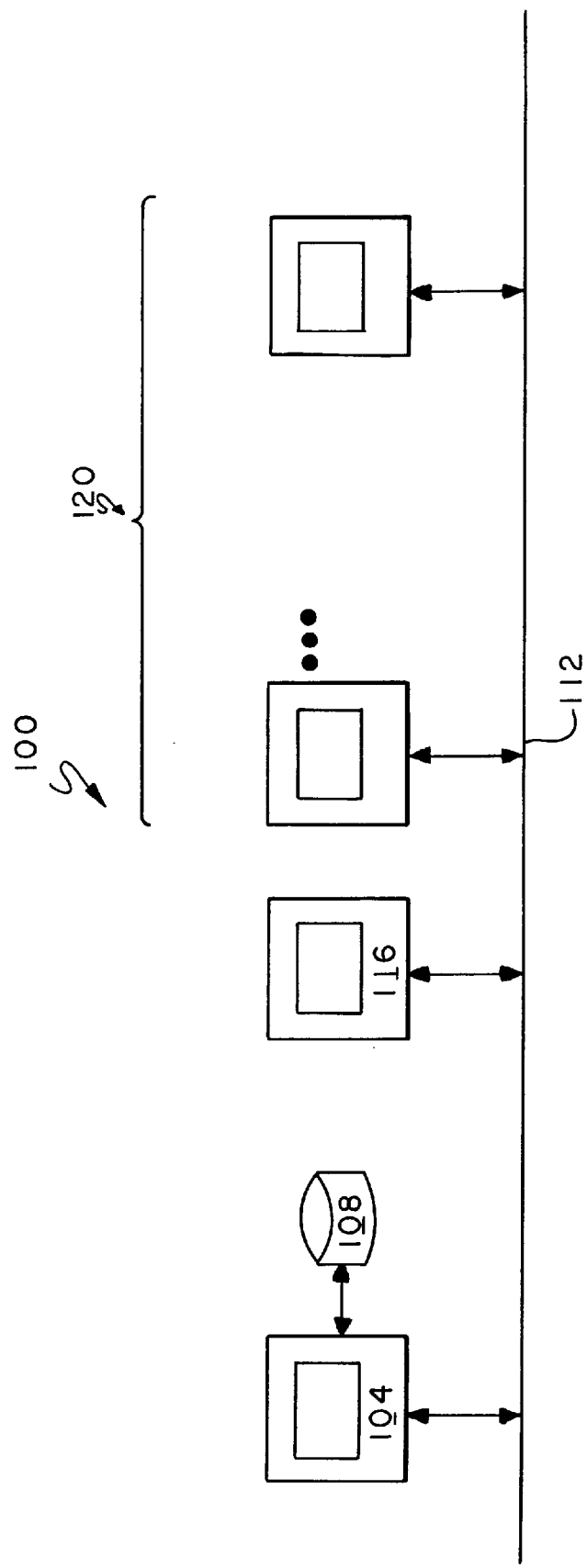
FIG. 2 presents a preferred hardware configuration upon which the publication system 20 resides.

In FIG. 2, a diagram is presented illustrating the preferred computer network hardware configuration 100 of the present invention. The file server 28 resides on the file server device 104, such as a Macintosh computer by Apple Computer, Inc., which has a data channel to a persistent read/write data storage device 108, such as a magnetic data storage disk, for storing both publication system 20 start-up data files and publication specific files such as publication layout and article files. Thus, the file server 28 retrieves and stores data to the storage device 108. In the desktop publishing industry it is not uncommon for the computing devices on the network 112 to be relatively inexpensive and to have somewhat primitive multitasking capabilities. Thus, substantial data processing by the file server device 104 in addition to the file read/write operations to the storage device 108 can degrade publication system 20 performance significantly. Therefore, to achieve satisfactory user response regardless of a publisher's computational capabilities and without requiring further hardware purchases for computing devices with greater computing proficiency, the data controller 32 is designed to be optionally located on a separate computing device from the file server device 104 on which the file server 28 resides. Thus, in this optional and generally preferred configuration, the data controller 32 can service a client application request for publication description data while, concurrently, the file server 28 reads or writes a publication file. Therefore, in FIG. 2, the data controller 32 is assumed to reside on a conventional computing device 116 such as a Macintosh computer by Apple Computer, Inc.

The network configuration 100 also includes a plurality of publication system 20 user computing devices 120 such as Macintosh computers by Apple Computer, Inc. A portion of the publication system 20 executes on each user desktop publishing device 120. The publication system 20 architecture isolates the interprocess networking communication between the data controller device 116 and the publication client applications (e.g., the article assignment unit 40, the layout application software unit 44, and the article text editing unit 52) residing on the desktop publishing devices 120 substantially to the utilities 36 and the data controller 32. Thus, most utilities 36 execute on a user desktop publishing device 120. Moreover, each device 120 supports the functionality required by at least one of the primary types of users, i.e., managers, layout designers and writers/editors. Thus, a device 120 which provides managerial support allows a publication manager to (re)assign articles and to (re)schedule publication items, both via the article assignment unit 40 and an "edit header" utility which is described below with reference to FIG. 4. A device 120 which provides layout support, via the layout application software unit 44, preferably also allows a layout designer to check-in/check-out layout files via the check-in/check-out utility and to assign articles via the article assignment unit 40. A device 120 which provides article editing support preferably allows a writer/editor to check-in/check-out article files via the check-in/check-out utility and to use the capabilities of the article text editing unit 52.

Figure 3:
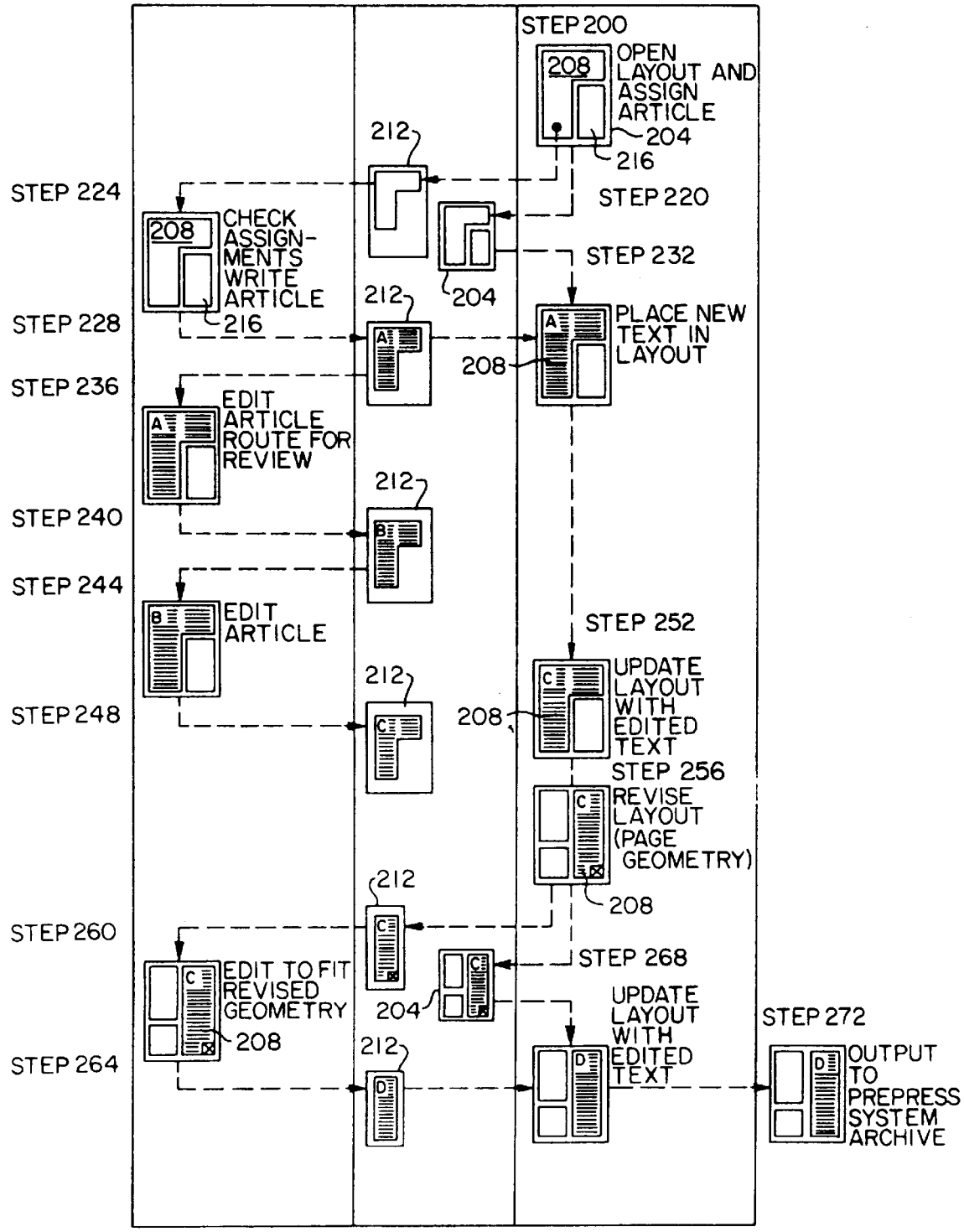
FIG. 3 presents a diagram of the workflow for creating a publication using the publication system 20.

Referring now to FIG. 3, an example is presented of the workflow when the present invention is utilized to facilitate the publication process. The figure contains three columns. The leftmost column designates the sequence of steps performed by a writer/editor(s) using the article text editing unit 52. The rightmost column illustrates the sequence of steps performed by a layout designer using both the article assignment unit 40 and the layout application software unit 44. The center column illustrates the actions performed by the publication coordinator 24. In step 200, having previously logged on to the publication system 20, the layout designer checks-out or creates a publication layout file 204. Subsequently, using the article assignment unit 40, the layout designer assigns an article to be laid out in layout area 208 to a specific writer/editor. This results in an article file 212 automatically being created (if not already existing) with information containing, among other things, the identification of the writer/editor to whom the article is assigned, the due date for the article and a designation of the geometry or shape of the area 208 where the article is to be placed. In addition, if the layout designer chooses, a bit map of the layout and contents of all other publication items 216 on the page(s) where the article is to be laid out can be included in the article file 212. Further, reference data is inserted into the layout file 204 associating the article file 212 with the area 208. Once these actions have been accomplished, the publication coordinator 24 can automatically notify the specified writer/editor of the new article assignment if (s)he is logged on to the publication system 20. In step 220, the layout designer then checks-in the layout file 204. In step 224, when the writer/editor assigned to write the article corresponding to the article file 212 receives notification of the assignment at his/her desktop publishing device 120, the writer/editor uses the article text editing unit 52 to check-out the article file 212, via the article retrieval unit 56. Upon receiving the article file 212, the article text editing unit 52 automatically displays the (first page of the) article area 208, preferably, in WYSIWYG format. That is, the article area 208 is displayed on the page in the position and in the area it is currently proposed for publication and, if included in the article file 212, a bit map or picture of the other publication items 216 on the same page(s) is displayed. The writer/editor subsequently chooses from among the available text editing display formats a desirable format for viewing the text to be entered during article creation. When the article is completed, in step 228 the article file 212, containing the newly entered text, is checked-in to the publication coordinator 24. If the layout designer has the layout file 204 checked-out, then the check-in of the article file 212 automatically causes a notification to be sent to the layout designer indicating that the text of the article for area 208 has been updated. Otherwise, whenever the layout designer checks-out the layout file 204, (s)he is automatically notified that the text of the article for area 208 has been updated. Thus, in step 232 when the layout designer again checks-out the layout file 204, via the layout application software unit 44, the automatic notification of a change to the article file 212 provides the impetus for the designer to request an update to the layout file 204 and its display via the layout application software unit 44. Independent of the actions of the layout designer, in step 236 the writer/editor again checks-out the article file 212 to edit it using the article text editing unit 52. In step 240, the writer/editor checks-in the article file 212 with a designation that it should be routed to a second writer/editor for review. Thus, a notification is both automatically sent to the layout designer indicating the article file 212 text has changed and, in addition, if a second writer/editor is logged on to the publishing system 20, then a notification is automatically routed to him/her that the article file 212 is available for review. Thus, upon notification in step 244, the second writer/editor checks-out and also edits the article file 212 using the article text editing component 52 residing upon his/her desktop publishing device 120. In step 248, the second writer/editor also checks-in the article file 212. In step 252, when the layout designer again checks-out the layout file 204 via the layout application software unit 44, the designer is notified of the article file 212 text change and can therefore request that an updated version of the article file 212 be incorporated into the layout file 204. In step 256, the layout designer subsequently decides to decrease and relocate the article area 208. Once notice is given to the publication coordinator 24 of the layout file 204 changes, the new geometry for the article area 208 is automatically written to the article file 212. Subsequently, assuming the writer/editor assigned to the article is logged on to the publication system 20 and has either checked-out the article file 212 or provided the data controller 32 with a query notification allowing the writer/editor to be notified whenever the geometry of the article file 212 changes, the publication coordinator 24 automatically generates a notification which is sent to the assigned writer/editor indicating that the geometry for the article has changed. In step 260, the assigned writer/editor checks-out the article file 212 to modify the article so that it will fit in the shortened article area 208. Note that in displaying the article with the article text editing unit 52, the WYSIWYG format is capable of displaying the entire text of the article due to a text overflow feature which allows text beyond the bounds of the assigned geometry to be displayed on a separate page. In step 264, the writer/editor checks-in the shortened version of the article file 212. As before, the layout designer is automatically notified of the article file 212 change whenever the layout file 204 is checked-out. Thus, in step 268 when the layout designer checks-out the layout 204, the layout designer is notified of a new version of the article file 212. Finally, once all new articles have been incorporated into the layout, the layout designer in step 272 sends the layout file 204 to both a printing system and an archive storage device (both not shown).

Figure 4:
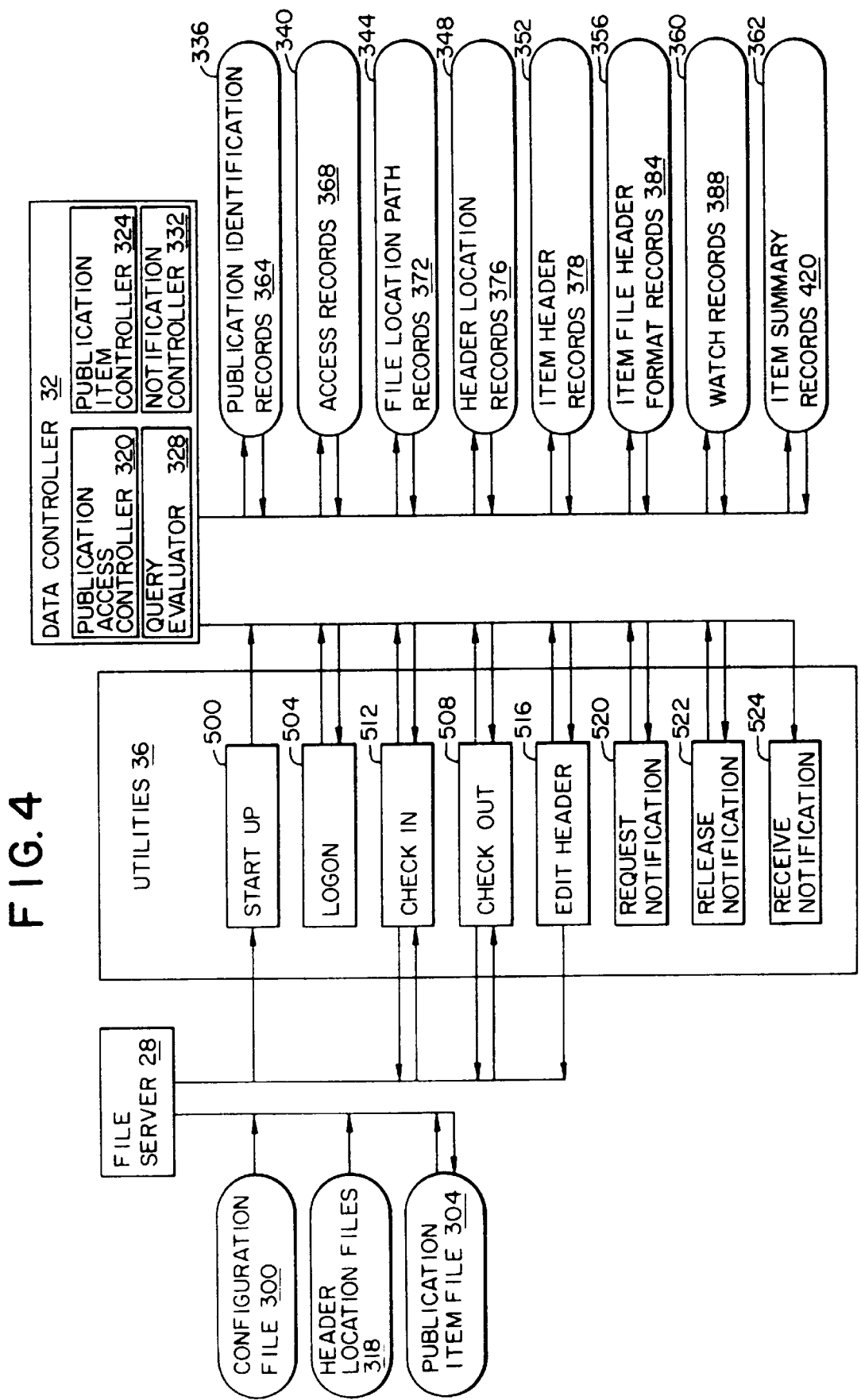
FIG. 4 presents a more detailed block diagram of the publication coordinator 24 than is given in FIG. 1.

In FIG. 4, a diagram is presented giving a more detailed view of the publication coordinator 24. In particular, FIG. 4 discloses the data flows between the data repositories and the utilities 36. The file server 28 accesses the following files residing on the storage device 108: a configuration file 300 containing data required to initialize the publication system 20, the publication item files 304, one such file per item to be published, and a collection of header file format files 318 for interpreting the file header information residing in each publication item file 304. More precisely, the configuration file 300 provides:

(4.1) the list of publications known to the publication system 20;

(4.2) publication access data specifying the access privileges of publication system 20 users and groups of users to various publication item files 304; and (4.3) the file server 28 path names to the locations where the publication item files 304 are stored on the storage device 108.

Figure 5:
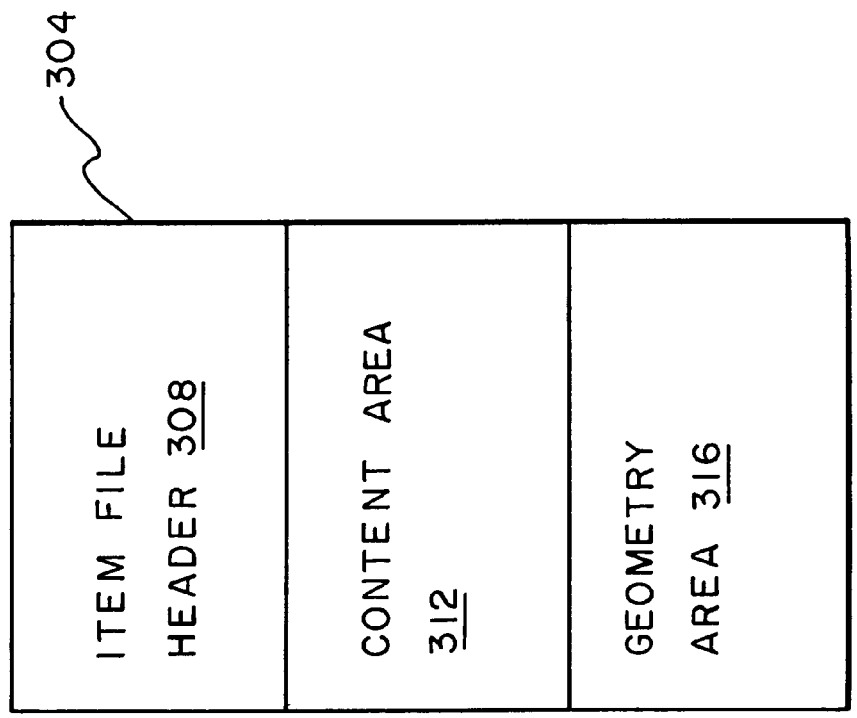
FIG. 5 gives the contents of a publication item file 304.

With regard to the publication item files 304, as can be seen in FIG. 5, each such file 304 includes at least an item file header 308 providing information about the contents of the file, a content area 312 giving the publication item defining data (e.g., the text of an article or the image data for a picture) and a geometry area 316 providing the data designating the location, orientation and shape of the layout area where the publication item is to be published. With regard to the item file header 308, it includes at least the following fields:

(5.1) a file name field giving the name for this item publication file 304 by which the file server 28 can identify it;

(5.2) an item name field providing the name by which the publication item is displayed and known to a user;

(5.3) a check-out name field providing the identification of a user that has this publication item file 304 checked-out for exclusive use;

(5.4) a publication name field providing the name of the publication within which the publication item is being published;

(5.5) a section name field providing the name of the section within the publication (e.g., the sports section of a newspaper publication) where the publication item is being published;

(5.6) a date due field providing the date of the next publication deadline for the publication item;

(5.7) a content time stamp field providing the last date and time the content area 312 was modified;

(5.8) a "routed-to" name field providing the name of a publication system 20 user or user group to whom notification will be given of the availability of the publication item file 304 upon check-in of the file assuming the routed-to user has established an appropriate query notification with the data controller 32;

(5.9) a status level field allowing a publisher to specify a status for the publication item (e.g., first draft, final draft, etc.); and (5.10) any optional publisher specified fields desired.

Referring again to FIG. 4, the data controller 32 includes the following submodules: a publication access controller 320, a publication item controller 324, a query evaluator 328 and a notification controller 332. The publication access controller 320 controls access to the publication coordinator 24 by establishing the validity of a user's logon name and password. In addition, the publication access controller 320 also establishes the validity of a user to access the publication items 304 related to a user chosen publication. Once access to the publication coordinator 24 is granted, access privileges are checked to determine which publication, publication section and publication item type (e.g., article, picture or layout) a user can potentially access as long as the publication system 20 client application being used by the user can process the publication item file type. To coordinate user requests to modify publication item files 304, the publication item controller 324 controls access to the publication item files 304 primarily by controlling access to the information contained in the item file header 308 as will be described below. To facilitate further coordination among publication system 20 users, the query evaluator 328 evaluates queries generated by requesters (i.e., users and/or client applications) regarding item file header 308 information. Thus, typical publication queries such as: "what are the publication items 304 that are assigned to a particular user and are due today?" can be answered by the query evaluator 328. The notification controller 332 also facilitates user coordination in that it provides a requester with the capability to be automatically notified when certain publication coordinator 24 events occur via the file notification and query notification capabilities. For instance, by using a file notification, a writer/editor having an article file 304 checked-out for editing is automatically notified when a change to the layout for the article (i.e., geometry area 312) is detected. More precisely, a requester of a file notification is automatically notified whenever the requestor provides the notification controller 332 with a notification request regarding at least one of a plurality of predetermined types of publication coordinator 24 events that can change a specific publication item file 304. In a publishing context, the predetermined event type changes for a publication item file 304 include changes to the item file header 308, changes to the content area 312, changes to the geometry area 316, deletion of the publication item file 304, check-in and check-out of the publication item file 304.

Alternatively, a requestor of a query notification is automatically notified whenever the results from a requester provided query changes. Thus, a requestor supplied query such as: "what article files with status='final' and publication='DESKTOP PUBLISHING' have been checked-in?" is re-evaluated whenever a publication coordinator 24 action occurs which changes (the state of) a publication item file 304 and in particular the item file header 308.

Figure 6:
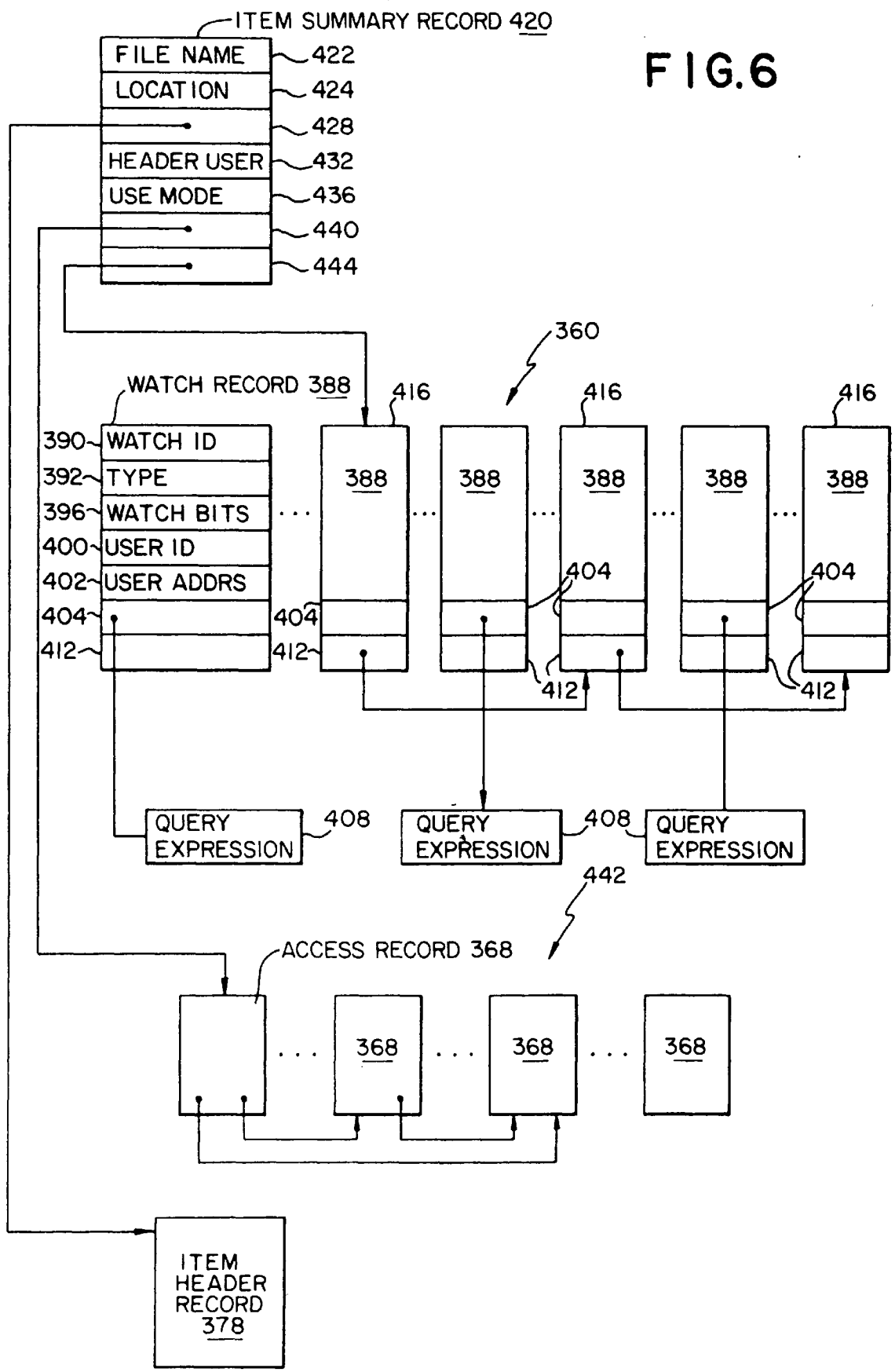
FIG. 6 presents a detailed description of the item summary record 420, the watch record 388 and the linkages between these records and other run time data records such as the item header record 378 and the access records 368.

Referring now to FIGS. 4 and 6, there is a plurality of data stores 336–362 connected to the data controller 32. These data stores preferably reside in the primary random access memory of the data controller device 116. Each of these data stores store information required by at least one of the above submodules 320–332 of the data controller 32. A description of each of the data stores follows:

(6.1) a collection 336 of publication identification records 364. Each record contains the identification of a publication known to the publication system 20. Each record 364 preferably contains a string of characters designating the name of a publication known to the publication system 20. The records 364 are initialized with the publication identification information residing in the configuration file 300. The records 364 are used by the publication access controller 320 in determining which publication item files 304 a user or user group should have access to;

(6.2) a collection 340 of access records 368.

Each record 368 contains the identification and publication access privileges of a user or user group known to the publication system 20. The records 368 are initialized with access information residing in the configuration file 300. The records 368 are used by the publication access controller 320 in determining which publication item files 304 a user or user group should have access to;

(6.3) a collection 344 of file location path records 372. Each record 372 contains a character string identifier giving the file server 28 path name to a storage area on the data storage device 108 where publication item files 304 are stored. The records 372 are initialized from information residing in the configuration file 300. During publication system 20 operation, the records 372 are downloaded to the user's desktop publishing device 120 by the publication access controller 320 once the user's identification has been verified;

(6.4) a collection 348 of header location records 376. Each record 376 contains information designating the location of the item file header 308 within a specific type of publication item file 304 (e.g., article, image or layout). Each record 376 is initialized with a copy of the contents of one of the header location files 318. These records are copied to a user's desktop publishing device 120 by the publication access controller 320 once the user's identification has been verified;

(6.5) a collection 352 of item header records 378. Each record 378 is a copy of an item file header 308. There is exactly one record 378 in the collection 352 per publication item file 304. The records 378 are used by the publication item controller 324 for granting a client application access to the related publication item file 304. The records 378 are also used by the query evaluator 328 as input in determining which publication item files 304 (i.e., item file headers 308) satisfy a query being evaluated;

(6.6) a collection 356 of item file header format records 384. Each record 384 provides a description of the format of an item header record 378, equivalently, an item file header 308. It is not uncommon for the format of the header records 308 and 378 to vary by the following classifications: publication, section and/or publication item type (e.g., article or image). Thus, potentially there is a unique file header format record 384 per combination of publication, section and publication item type. Each item file header format record 384 is initialized with header format descriptions residing in the configuration file 300. The records 384 are used by the query evaluator 328 to interpret the item header records 378 when evaluating a query;

(6.7) a collection 360 of watch records 388 which is maintained by the notification controller 332. Each valid watch record 388 contains the information necessary to allow the notification controller 332 to do either a file notification or a query notification when a publication coordinator 24 event related to the watch record 388 occurs. Referring to FIG. 6, each watch record 388 includes:

(6.7.1) a watch record 388 identification field 390, known as the "watchid" field. The value in this field identifies each watch record 388 uniquely;

(6.7.2) a type field 392 indicating to which of the two notification types, file or query, the watch record corresponds;

(6.7.3) a bit string field 396 of predetermined length, known as the "watchbits" field. Each bit of the watchbits field either represents one of the predetermined types of publication coordinator 24 events regarding a publication item file 304 for which a file notification should be generated or represents a qualification of how a user is to be notified of the results representing a query notification;

(6.7.4) a user identification field 400, known as the "userid" field, for storing the identification of the user requesting notification whenever one of events specified by the watch record 388 occurs;

(6.7.5) a reference field 404 to the stored query expression 408 to be (re) evaluated when the watch record 388 corresponds to a query notification;

(6.7.6) a reference field 412 which links together the watch records 388 relating to a file notification on the same publication item file 304. Each such file watch record 388 provides the information needed by the notification controller 332 to initiate a file notification regarding the related publication item file 304. Note that the file watch records 388 for a given publication item file 304 form a linked list 416;

(6.8) a collection 362 of item summary records 420. Each valid item summary record 420 provides access to substantially all information residing on the data controller device 116 relating to a specific publication item file 304. Moreover, for each publication item file 304 there is a unique item summary record 420. Each item summary record 420 is initialized, maintained and accessed via the publication item controller 324. Referring to FIG. 6, each item summary record 420 includes:

(6.8.1) a filename field 422, specifying the file server 28 file name for the publication item file 304;

(6.8.2) a file server 28 location field 424 where the corresponding publication item file 304 is located on the storage device 108;

(6.8.3) a reference field 428 providing access to the item header record 378 which is a copy of the item file header 308 in the related publication item file 304;

(6.8.4) a "headeruser" field 432 for storing the identification of the user (if any) having the exclusive use for modification of the item header record 378 (and, equivalently, the corresponding item file header 308);

(6.8.5) a "usemode" field 436 indicating how the item header record 378 and item file header 308 (for simplicity, denoted the headers 378, 308) are being used by the user whose identification is stored in the headeruser field 432. A user obtains access to the headers 378, 308 in one of the following modes: read only mode, whereby the user can only read the header 378; read/write mode, whereby the user has exclusive use to both read and write the headers 378, 308; and extended mode, whereby the user has exclusive use to both read and write the headers 378, 308 and such that the user can maintain this access mode for an extended time (e.g., minutes). Note, preferably, the extended mode is the access mode by which a publication manager accesses, for example, an article file to modify the due date within the article file's header 308;

(6.8.6) a reference field 440 referencing a queue 442 of publication access records 368 denoting users who are waiting for access to the publication item file 304 related to this summary record 420;

(6.8.7) a reference field 444 referencing the list 416 of all file watch records 388 which correspond to file notifications for the publication item file 304 related to this summary record 420.

Referring again to FIG. 4, included in the utilities 36 of the publication coordinator 24 is a start-up utility 500 which initializes the data stores 336–362, and subsequently registers the data controller 32 on the network 112 as available for servicing client application requests. Following execution of the start-up utility 500, the logon utility 504 must be used in order for a potential user to gain access to the publication system 20. Thus, the logon utility 504 can be invoked from any desktop publication device 120, and executes on each such device communicating over the network 112 with the publication access controller 320 to determine a user's access privileges; that is, whether the user's logon input corresponds to an access record 368 and, if so, which publication(s) the user has access to. Once a user is logged on, a publication item file 304 can be checked-out via the check-out utility 508 or, if already checked-out, then subsequently checked-in via the check-in utility 512. Thus, upon invoking the check-out utility 508 from the user's desktop publishing device 120, the utility communicates with the publication item controller 324 to gain publication item access and with the file server 28 to retrieve a copy of the related publication item file 304. Conversely, upon invoking the check-in utility 512 from the user's desktop publishing device 120, the check-in utility communicates with the publication item controller 324 to release the user's exclusive access to the checked-out publication item file 304, and subsequently provides the file server 28 with a new version of the publication item file 304 to be written to the storage device 108. As an alternative to checking-out a publication item file 304, the edit header utility 516 can be used to modify item file header 308 fields concurrently and substantially independently of the use of the check-out and check-in utilities 508, 512. A user invokes the edit header utility 516 from his/her desktop publishing device 120, after which the utility communicates with the publication item controller 324 to obtain the desired item header record 378. Once obtained and modified as desired, the edit header utility 516 communicates the new header information to both the file server 28 and the publication item controller 324 to overwrite the item file header 308 and the item header record 378, respectively. The request notification utility 520 allows a requestor to request either file notifications or query notifications from the notification controller 332. Moreover, note that such notifications can be set manually or automatically depending on whether the request notification utility 520 is invoked consciously by the user (e.g., by explicitly requesting a query notification) or the utility is invoked as a side-effect in response to some user action (e.g., during an article file check-out, a file notification is automatically requested for any changes to the geometry area 336 of the article file). While such a notification remains in effect (equivalently, the related watch record 388 is valid), the requester can be repeatedly notified of publication coordinator 24 events relevant to the set notification request. The receive notification utility 524, preferably also residing on each desktop publishing device 120, receives the notifications generated by the notification controller 332. Once a notification is received, the receive notification utility 524 determines whether sufficient information has been received to effectively allow the requester to respond to the notification.

Figure 7:
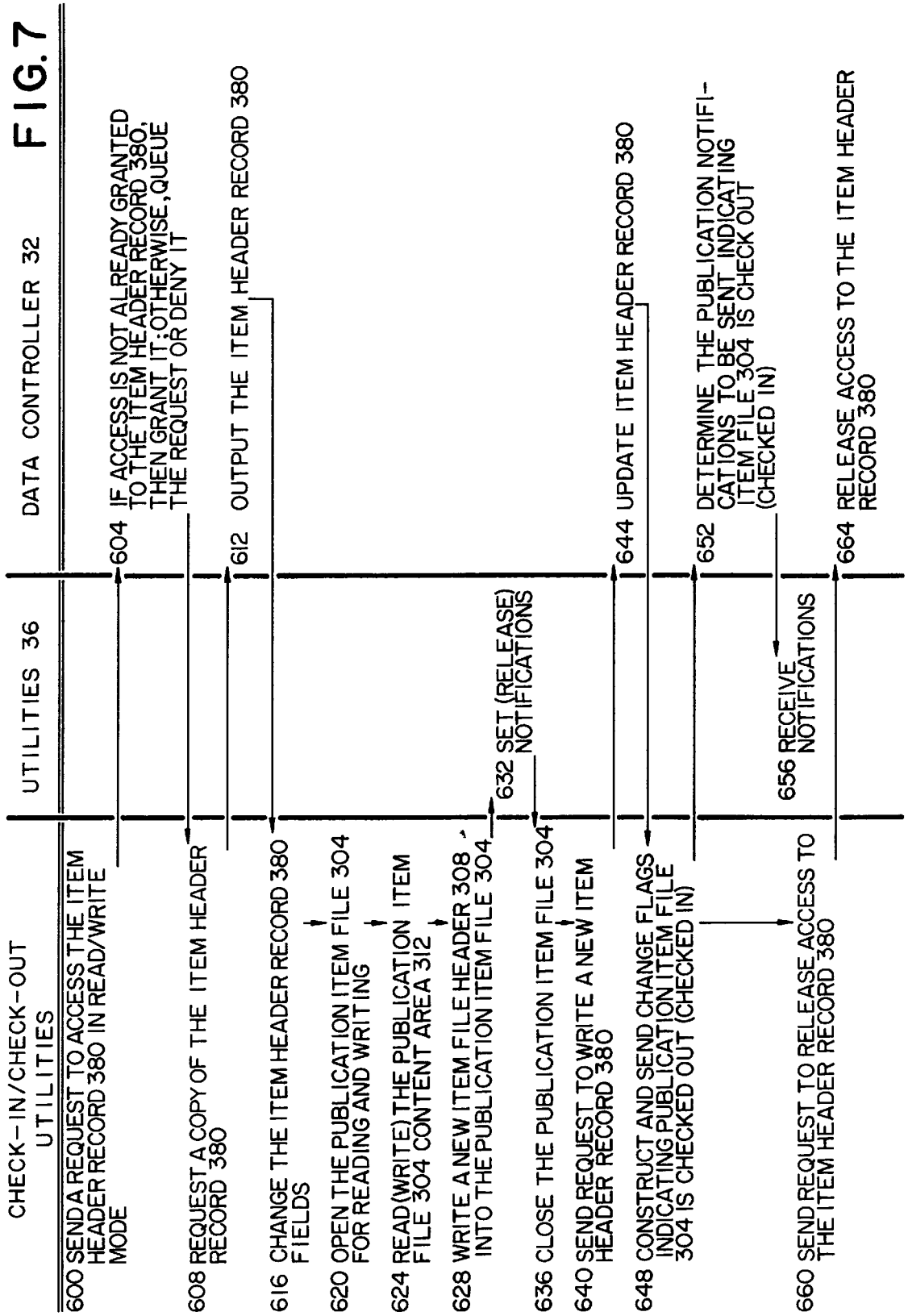
FIG. 7 is a flowchart describing the steps occurring during a check-out or check-in operation.

To further describe the novelties of the publication coordinator 24 regarding the check-out/check-in utilities 508, 512, reference is made to FIG. 7. This figure presents a high level flowchart of the coordinated sequence of steps taken by the check-out/check-in utilities and the data controller 32. The column of steps on the left of FIG. 7 are the steps taken by the check-out/check-in utilities. Interspersed between these steps are the steps taken by the data controller 32

(more precisely, the publication item controller 324) in the rightmost column, and in the middle column are the steps which invoke the notification utilities 520–524. The steps are substantially similar for the check-out and check-in utilities 508, 512. The differences between the two utilities are given in parentheses. That is, by disregarding all text in parentheses, the remaining descriptions of FIG. 7 give the steps for the check-out utility 508. Alternatively, by substituting the text in parentheses for the word(s) immediately preceding the parenthetical text, the steps for the check-in utility 512 are given. Thus the steps of FIG. 7 will be discussed in both the check-out and check-in contexts. In step 600, the check-out (check-in) utility, preferably residing on a desktop publishing device 120, initiates a check-out (check-in) of a publication item file 304 (for simplicity, the item file 304) by requesting the publication item controller 324 to grant read and write access to the item header record 378 describing the item file 304. The request includes at least the identification of the user that invoked the check-out (check-in), the item file 304 filename (as known by the file server 28) and additionally the name of the publication to which the item file 304 is associated. In step 604, access to the item header record 378 is determined. The publication item controller 324 accesses the collection 362 of item summary records 420 (and, in turn, the data structure linkages of FIG. 6) to determine the item summary record 420 describing the item file 304 by comparing the input item file 304 name with the publication item name stored in each item header record 378. Once the correct item summary record 420 is obtained, the he,aderuser field 432 is checked for a valid user identifier. If such an identifier is found, and the usemode field 436 indicates that the item header record 378 is being accessed in extended mode, then a "request denied" message is generated and returned to the check-out (check-in) utility. Alternatively, if the headeruser field 432 contains a valid user identifier, but the usemode field 436 does not specify extended mode, then the item header record 378 is presumably only being accessed for a short time period (e.g., milliseconds). Thus, the access record 368 of the check-out (check-in) user is put on the queue 442, referenced by the item summary record 420, of users waiting to gain access to the item header record 378. Otherwise, if no valid identifier is found, then the user's identification is written into the headeruser field 432 and, in addition, a value indicating that the item header record 378 is being accessed in read/write mode is written into the usemode field 436. Subsequently, a "request honored" message is returned to the check-out (check-in) utility. Assuming the request honored message is returned, in step 608 the check-out (check-in) utility requests a copy of the item header record 378. Note that accompanying the request is substantially the same parameter values as for the request of step 600. Subsequently, in step 612 the publication item controller 324 checks the validity of the request against the values in the headeruser field 432 and the usemode field 436. Assuming the request is valid, the publication item controller 324 outputs the item header record 378 and the item file 304 location to the check-out (check-in) utility. Upon receiving the item header record 378, the check-out (check-in) utility, in step 616, proceeds to change various fields within the received copy of the item header record 378. In particular, at least the item header record 378 field(s) identifying who has the item file 304 checked-out (checked-in) is modified. Thus, upon check-out the current user's identification is written into the field(s) while alternatively upon check-in values are placed in the field(s) designating that the item file 304 is not checked-out. In step 620, the check-out (check-in) utility uses the item file 304 location information received from the publication item controller 324 to send a request to the file server 28 to open the item file 304 for reading and writing. In step 624, assuming the file server 28 grants the request of step 620, the check-out utility 508 reads at least the content area 312 and preferably also the geometry area 316 of the item file 304, thus creating a copy of these portions of the item file 304 locally on the user's desktop publishing device 120. Alternatively, if a check-in is taking place in step 624, then a presumably modified copy of the content area 312 of the item file 304 resides locally on the user's desktop publishing device 120. Thus, during check-in, the local copy of the content area 312 is written into the content area 312 of the item file 304. Subsequently, in step 628, regardless of whether a check-out or check-in is occurring, the item header record 378 modified in step 616 is written to the item file header 308. This assists in providing insurance that upon a publication system 20 shutdown or failure that substantially the entire configuration of the data stores 336–362 (except the watch record store 360) can be reconstructed upon restart-up from the information residing on the data storage device 108. In step 632, assuming first that a check-out is occurring, the request notification utility 520 is invoked to instruct the notification controller 332 to create watch records 388 related to the item file 304 such that whenever other users independently modify portions of the item file 304 such as the geometry area 312, the user associated with this check-out will be notified. Alternatively, if a check-in is occurring in step 632, then the release notification utility 522 is used to instruct the notification controller 332 to delete at least all watch records 388 automatically generated during the check-out of the item file 304. Subsequently, in step 636 the check-out (check-in) utility closes the item file 304. In step 640, the check-out (check-in) utility sends a request to the publication item controller 324 requesting that the local modified copy of the item header record 378 (that was also written into the item file 304 in step 628) be used to overwrite the current (now outdated) version of the item header record 378 residing on the data controller device 116. In step 644, the publication item controller 324 validates the request as in steps 600 and 608, overwrites the item header record 378 and returns the request honored message. Following this, in step 648 the check-out (check-in) utility constructs a bit string, denoted the "changeflags," which corresponds to the watchbits field 396 of the watch records 388. Thus, each bit of the changeflags designates a unique predetermined publication coordinator 24 event which results in a modification to a publication item file 304. In the context of the check-out utility 508, step 648 preferably sets only the changeflags bits designating that the item file header 308 of the item file 304 has changed and that the item file 304 is checked-out. Alternatively, if step 648 is in a check-in, then the bits of changeflags to be set are those designating that the item file header 308 of the item file 304 has changed, the content area 312 has changed and the item file 304 has been checked-in. Once the changeflags bit string has been constructed, it and filename of item file 304 are sent to the notification controller 332. In step 652, the notification controller 332 uses the filename of the item file 304 to access the related item summary record 420 and subsequently uses the reference field 444 (FIG. 6) to access the list 416 of file watch records 388 (linked via the reference field 412) related to the item file 304. For each file watch record 388 on this list, the notification controller 332 compares the watchbits field 396 with the changeflags to determine which corresponding bits are set. Whenever a watchbits bit and a corresponding changeflags bit are both set, this implies that the user identified by the userid field 400 has requested notification of a specific publication coordinator 24 event causing modification of the related publication item file 304, and that this event has occurred. Thus, for each such file watch record 388 on the list 416 where corresponding bits are set in both the watchbits and the changeflags, the user identified by the userid field 400 is to be notified. In addition, the notification controller 332 determines which of the query watch records 388 the newly written item header record 378 (from step 640) causes a change in the evaluation of the query expression 408. That is, for each query watch record 388 in the collection 360:

(7.1) if the item header record 378 satisfies the query expression 408 currently but did not previously then the user identified by the userid field 400 is to be notified;

(7.2) if the item header record 378 previously satisfied the query expression 408 but does not currently, then the user identified by the userid field 400 is also to be notified; and (7.3) if the item header record 378 previously satisfied the query expression 408 and currently also satisfies the query expression, however, at least one field of the item header record has changed, then the user identified by the userid field 400 is also to be notified.

In step 656, the notification controller 332 communicates with the instantiations of the receive notification utility 524 residing on the desktop publishing devices 120 to notify the users determined in step 652 of the changes for which notification was requested. Independent of step 652, the check-out (check-in) utility, in step 660, sends a request to the publication item controller 324 to release the access granted in step 604 to the item header record 378. Finally, in step 664, after assuring the validity of the release request, the publication item controller 324 releases the granted access by setting both the headeruser field 432 and the usemode field 436 to predetermined values indicating that the item header record 378 is not currently being accessed. Subsequently, if there is an access record 368 on the queue 442, then the user whose access record is at the head of the queue is granted access to the item header record 378 and this access record is removed from the queue.

Figure 8:
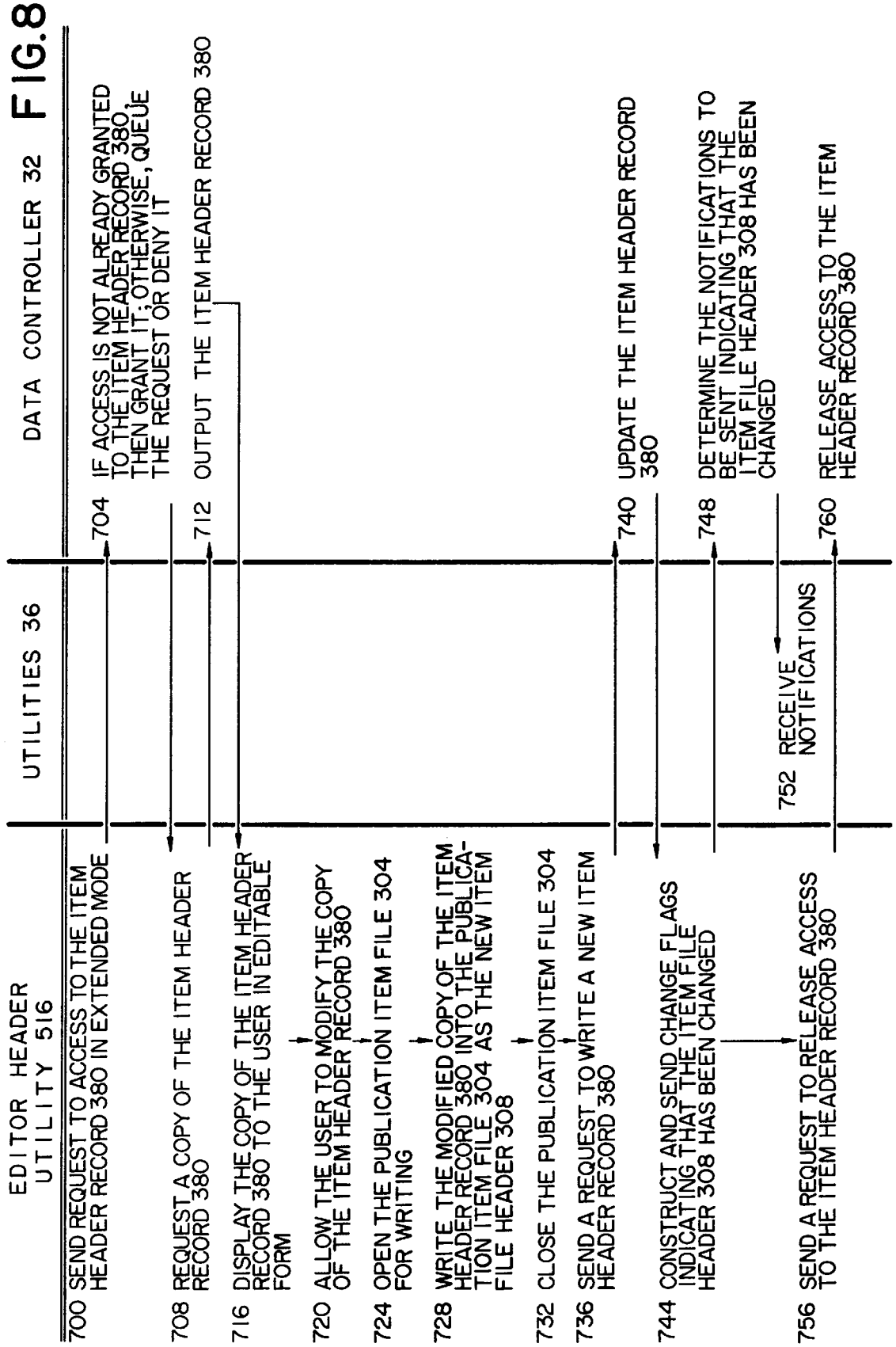
FIG. 8 is a flowchart describing the steps occurring during the editing of an item header record 378.

Referring now to FIG. 8, the steps performed during the edit header utility 516 are disclosed. Note that FIG. 8 is in the same format as FIG. 7. Thus, the leftmost column includes the steps performed by the edit header utility 516 executing on the user's desktop publishing device 120, the rightmost column includes the steps performed by the data controller 32 and the middle column includes the steps performed by other utilities 36. Also note that the steps 700–712 are substantially identical to the steps 600–612 of FIG. 7, the only difference being that in the edit header utility 516, step 700 requests access to the item header record 378 in extended mode rather than read/write mode. Thus, in step 700 the edit header utility 516 requests access to the item header record 378 related to the item file 304 of interest. In step 704, if access is currently granted, just as in step 604, either the user's access record 368 is put on the queue 442 or an access denied message is returned. Alternatively, if access is not currently granted, then the publication item access controller 324 grants the access. In step 708, the edit header utility 516 requests a copy of the item header record 378. In step 712, the publication item access controller 324 outputs the copy. Subsequently, in step 716 the edit header utility 516 displays the item header record 378 copy or a substantial portion thereof to the user via an editor for editing such records. In step 720, the user modifies the fields of the copy of the item header record 378, for example, the date due field. In step 724, the edit header utility 516 requests that file server 28 open the item file 304 for writing. Assuming the request is granted, in step 728 the newly modified copy of the item header record 378 is written into the item file 304 as the new item file header 308. Thus, upon a publication system 20 shutdown or failure, a new item header record 378 can be reconstructed from the item file header 308 information residing on the data storage device 108. In step 732, the edit header utility 516 sends a request to the file server 28 to close the item file 304. Subsequently, in step 736 a request is also sent to the publication item controller 324 to overwrite the current item header record 378 with the copy modified in step 720. In step 740, the publication item controller 324 assures the validity of the request (as in steps 604, 644 of FIG. 7), updates the item header record 378 to the modified copy and returns a request honored message. Upon receiving this message the edit header utility 516, in step 744, constructs and sends a changeflags bit string, in a manner similar to step 648 of FIG. 7, indicating that the item file header 308 has changed for the item file 304. Thus, the changeflags bit string includes at least one predetermined bit which when set designates that the item file header 308 and corresponding item header record 378 has been changed. Upon receiving the changeflags (and the filename of the item file 304 to which it applies), in step 748 the notification controller 332 determines the notifications to be sent to other users that have requested notification of a change to this item file header 308 and item header record 378. The processing done by the notification controller 332 in determining whom to be notified is substantially the same as described in step 652 of FIG. 7. Subsequently, in step 752 the notification controller 332 invokes the receive notification utility 524 to notify the users determined in step 748. Independently of step 748 but following step 744, the edit header utility 516 sends a request to the publication item controller 324 to release the access granted in step 704 to the item header record 378. In step 760, the publication item controller 324 clears both the headeruser field 432 and the usemode field 436 by writing predetermined values into the fields indicating that access to the item header record 378 is available.

Figure 9:
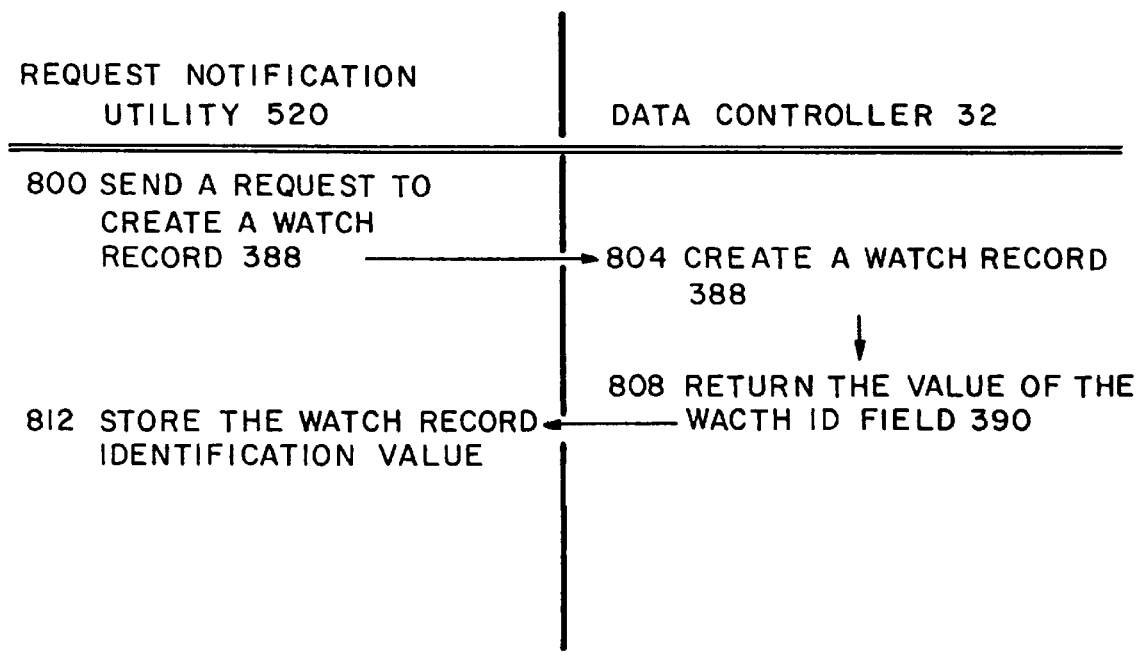
FIG. 9 is a flowchart describing the steps occurring during the process of requesting notification of future publication item file 304 changes.

In FIG. 9, a high level flowchart is presented of the steps taken by the request notification utility 520 and the data controller 32 when creating a watch record 388 for a file notification or a query notification. In step 800, the request notification utility 520 sends a request to the notification controller 332 of the data controller 32 to create a watch record 388. The request includes the following information supplied by the client application invoking the request notification utility 520:

(8.1) the identification of the user running the client application;

(8.2) the network 112 address of the user's desktop publishing device 120;

(8.3) a designation of whether a file watch record or a query watch record is to be created;

(8.4) if a file watch record is to be created, then:
  (8.4.1) the file server 28 file name of the publication item file 304 to be watched for changes requiring notification; and
  (8.4.2) a bit string designating the events on which to be notified;

(8.5) an encoding of the query expression if a query watch record 388 is to be created. In step 804, the notification controller 332 uses the above values to create a watch record 388. Thus, (8.1) is used as the value for the userid field 400; (8.2) is used as the value for the useraddrs field 402; (8.3) is used as the value for the type field 392; (8.4.1) is used to locate the item summary record 420 related to the publication item file 304 on which notification is requested; (8.4.2) is used as the value for the watchbits field 396; (8.5) is used as the value for the query expression 408. In addition, the notification controller 332 generates a unique value identifying the watch record 388 and enters this value in the watchid field 390. Subsequently, if the newly created watch record 388 is for a file notification, then it is linked onto the list 416 referenced by the item summary record 420 related to the publication item file 304 on which notification is requested. Thereafter, in step 808, the notification controller 332 returns the value of the watchid field 390 to the request notification utility 520. In step 812, the request notification utility 520 stores the returned watch record identification value in a predetermined location known by the invoking client application.

Figure 10:
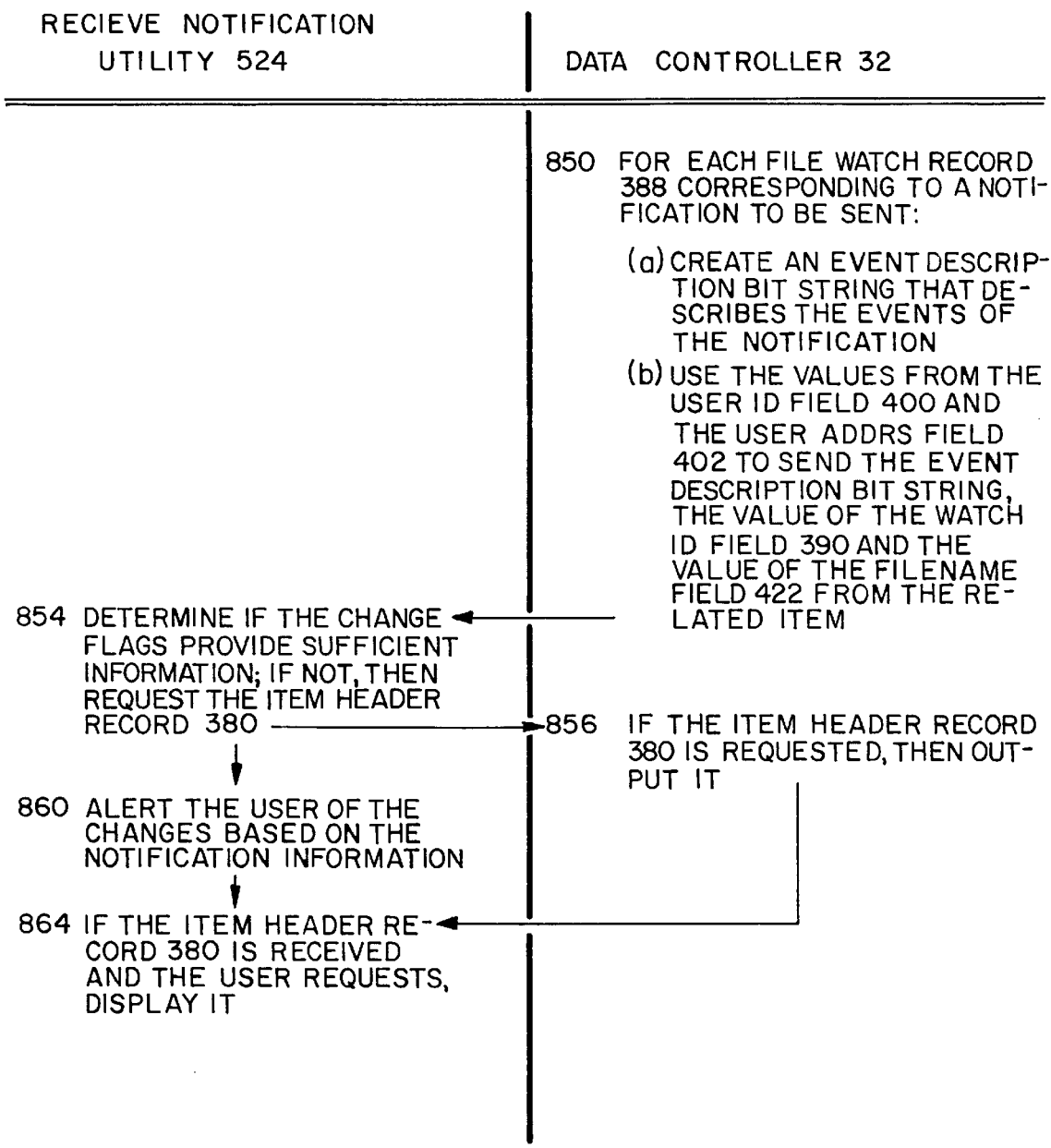
FIG. 10 is a flowchart describing the steps occurring during the process of receiving notification of a change to a publication item file 304.

In FIG. 10 a high level flowchart is presented of the steps taken by the receive notification utility 524 and the data controller 32 when a user is to be notified of a change for which notification was previously requested via the request notification utility 520. The flowchart presupposes that a client application has provided the notification controller 332 with information about a change that has been made to a publication item file 304 as in step 648 of FIG. 7. Thus, the information provided to the notification controller 332 includes: the file server 28 file name of the publication item file 304 (for simplicity, item file 304) that has been changed and a changeflags bit string where each bit, if set, signifies that a predetermined change has occurred to the item file 304. Preferably, the bit string has the same number of bits as the watchbits field 396 and each bit of the bit string corresponds to a unique bit in the watchbits field 396 such that corresponding bits describe the same change to the item file 304. Further, it is assumed that, as in step 652 of FIG. 7, the appropriate watch records 388 have been examined to determine which users should be notified of the current item file 304 change.

In step 850, the notification controller 332 of the data controller 32 executes two substeps for each watch record 388 for which a notification is to be sent to a copy of the receive notification utility 524 associated with a client application that requested notification. In step 850(a) an "event description" bit string is created that provides substantially all the information required by client applications regarding changes to the item file 304 and the reason for the notification. Preferably the event description bit string includes both the changeflags bit string precipitating the notification process and a collection of description bits providing the following information: whether the notification is a file notification or a query notification, and, if the notification is a query notification, then: whether the item file 304 previously did not satisfy the query expression 408 but does so now, or previously did satisfy the query expression but does not now, or if requested by the requestor, whether the item file 304 still satisfies the query expression but at least one of its item header record 378 fields has been modified.

In substep 850(b), the notification controller 332 uses the values of the userid field 400 and the useraddrs field 402 of the watch record 388 to route the notification information to the correct client application residing on the network configuration 100. The notification information includes: the event description bit string, the identity of the watch record 388 causing the notification from the watchid field 390 and the identity of the item file 304 from the filename field 422. Upon receiving the notification information, in step 854, the receive notification utility 524 determines automatically whether further information is required regarding the item file 304 that has changed. In the preferred embodiment, the event description bit string supplies sufficient information to alert a user to many publication item file 304 changes of interest. However, for some changes it is likely that when alerted, the user will desire to examine further information about the changed item file 304. Thus, in order to assure a prompt response in the event the user requests such information, the receive notification utility 524 requests a read only copy of the item header record 378 related to the item file 304 of the notification whenever the notification is a query notification and the item file 304 previously did not satisfy the query expression 408 but does now or the item file 304 still satisfies the query expression 408 but an item header 378 field has changed. Alternatively, the receive notification utility 524 also requests a read only copy of the item header record 378 if the notification is a file notification and the event description bit string has a bit(s) set indicating that the item file header 308 of the item file 304 has changed. Thus, if the item header record 378 is requested, then in step 856, the publication item controller 324 determines whether the request can be honored and, if so, subsequently returns a copy of the item header record 378. Independent of step 856, in step 860 the receive notification utility 524 alerts the user to the changes to the item file 304 in the case of a file notification or to a change in the results of a query in the case of a query notification. In step 864, the user has the option of displaying the item header record 378 for those circumstances where the item header record 378 was requested in step 854.

In a more general context, note that the architecture of the publication coordinator 24 can be used to develop data coordination systems for application areas other than the publishing industry. For example, in engineering design such as architectural or aerospace, there is a need to coordinate the information flow among engineering and management personnel while allowing both exclusive use and concurrent access to various inter-related portions of a design. Thus, an alternative embodiment of the publication coordinator 24 for an architectural application would allow a structural engineer to design and modify the structural components of a building while at the same time an interior designer or engineer is able to check-out and modify the interior design plans for a particular floor of the building and a manager is able to modify the schedules for either the structural engineer or the interior designer. Thus, using the architecture of the publication coordinator 24, one skilled in the art may provide a similar document control system for architectural applications whereby users developing different but interacting work products are allowed to work concurrently and still coordinate their efforts via a notification control system such as the notification controller 332. Thus, the interior designer can be automatically notified of a structural design change which affects the floor the interior designer is working on.

Figure 11:
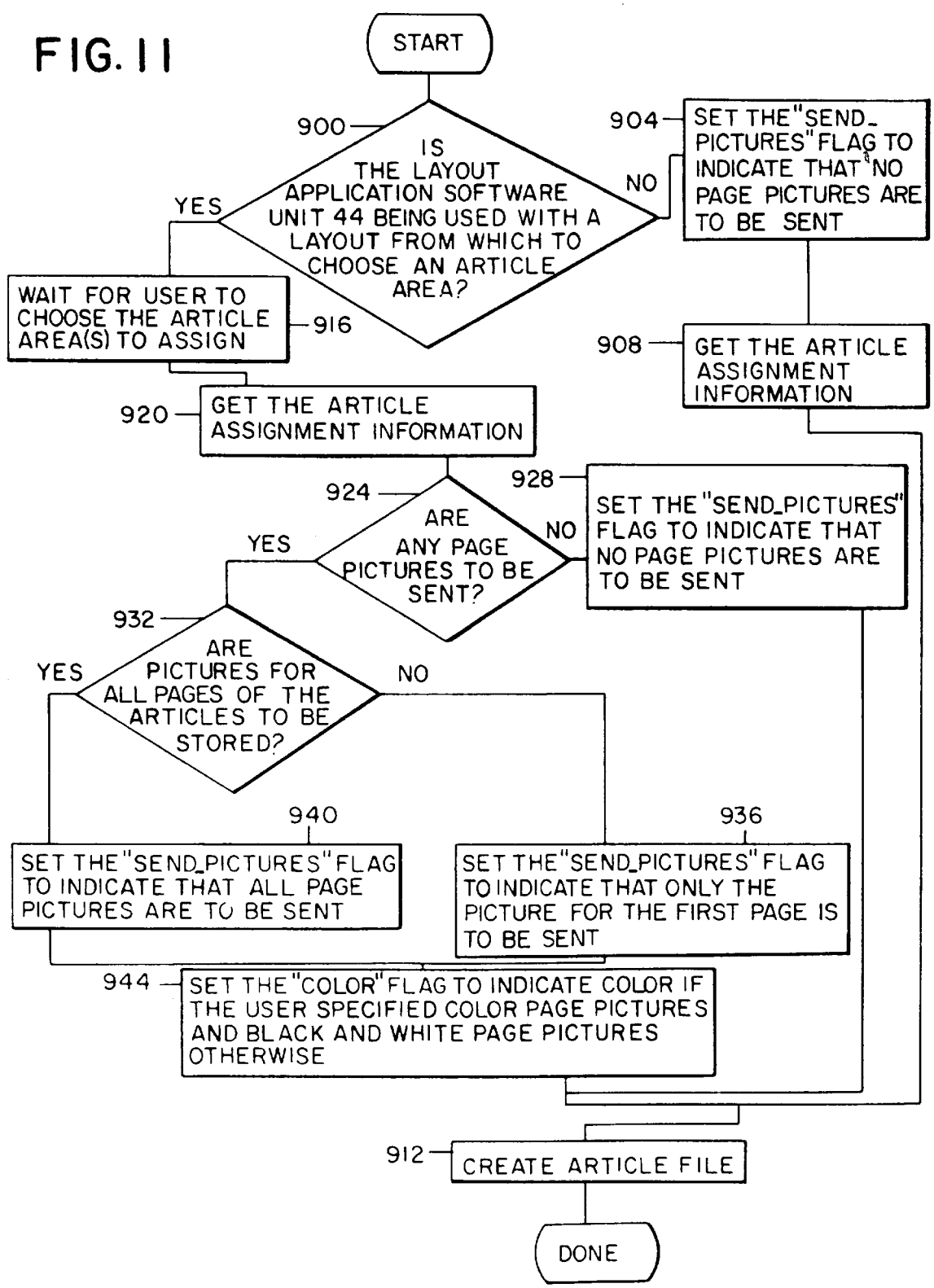
FIG. 11 is a flowchart describing the high level steps occurring when an article is assigned to a writer/editor.
Figure 12:
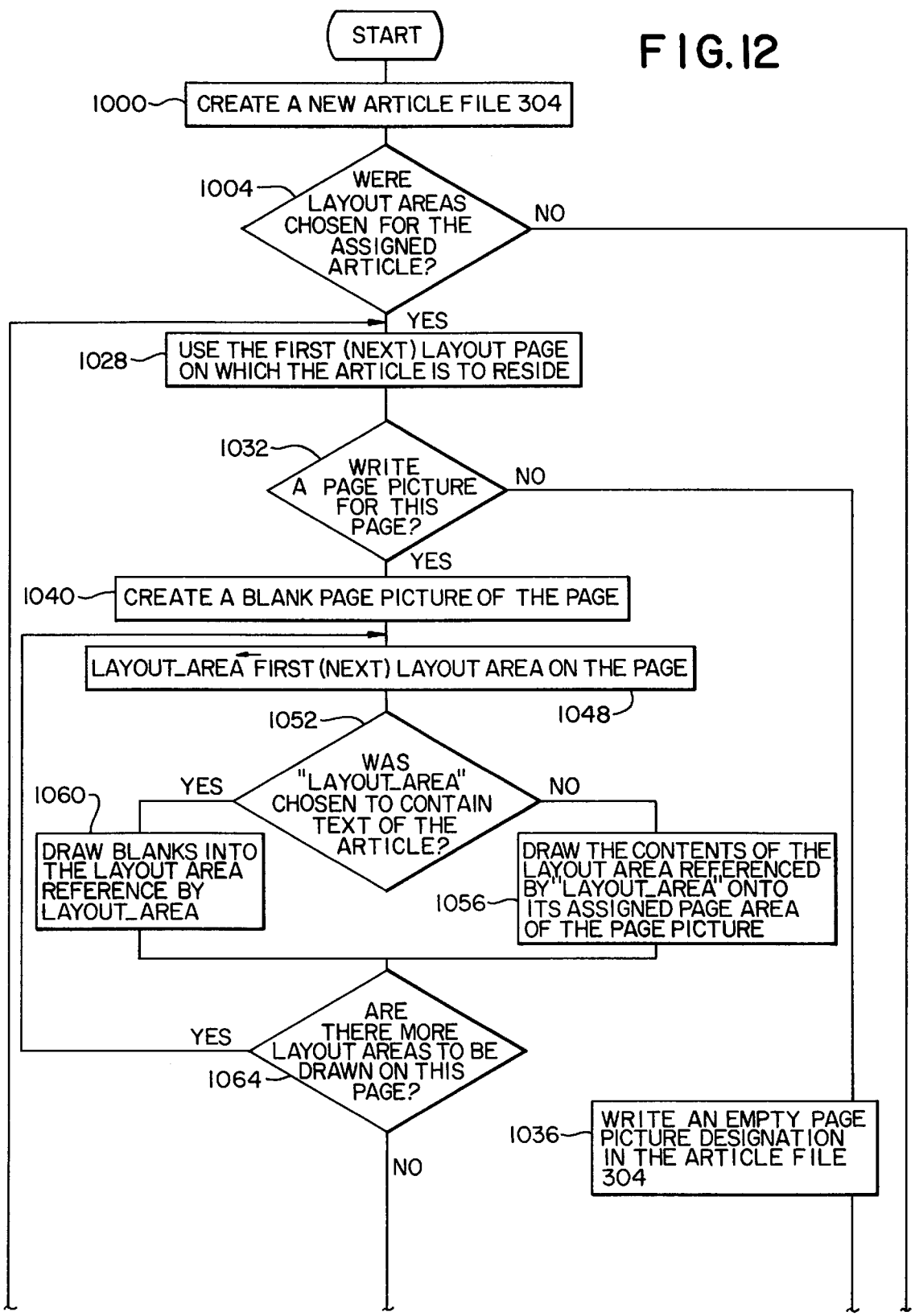
FIG. 12 is a flowchart describing the steps executed in writing the contents of a newly assigned article.
Figure 12:
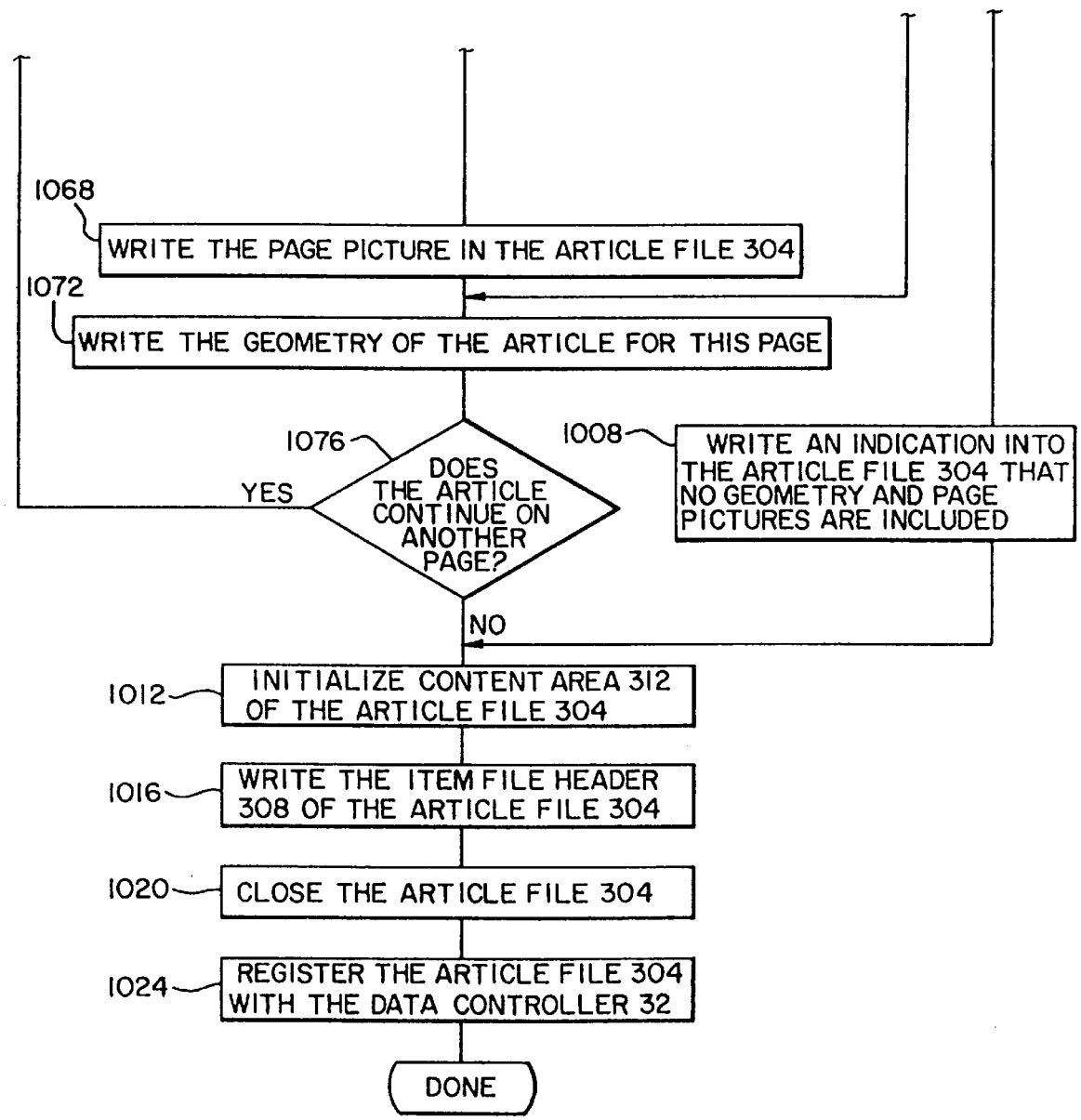
Figure 13:
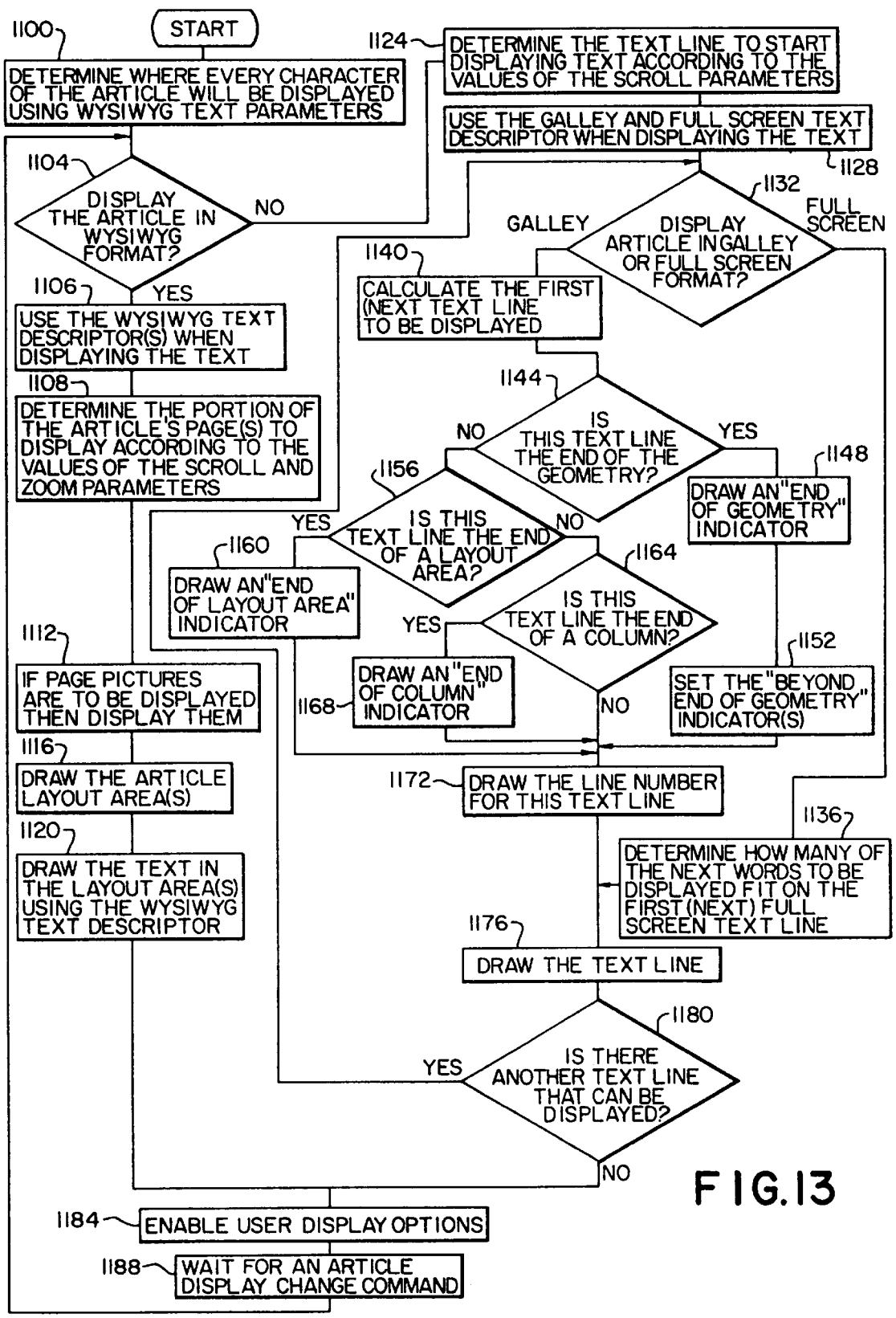
FIG. 13 is a flowchart describing the steps executed when formatting the article for display to a writer/editor using one of the display formats: WYSIWYG, Galley and full screen.

In FIGS. 11, 12 and 13 the flowcharts are presented for assigning and presenting an article to a writer/editor such that a bit map of each page upon which the article is laid out can optionally be associated with the article and displayed to the writer/editor via the article text editing unit 52. In FIG. 11 a high level flowchart is presented of the steps the article assignment unit 40 executes during the assigning of an article. The flowchart encompasses both the steps taken when a publication manager is assigning an article without the use of a publication layout file and also by a layout designer using a publication layout file via the layout application software unit 44. FIG. 12 presents the flowchart for creating the information associated with the newly assigned article, including any page bit maps, also known as "page pictures," and storing this information in a publication item file 304 stored on the data storage device 108. FIG. 13 presents a flowchart of the article retrieval process used by the article retrieval unit 56 to retrieve and display both the article and any associated page pictures.

Referring to FIG. 11, in decision step 900 a determination is made by the article assignment unit 40 as to whether the layout application software unit 44 is being used with a layout from which layout area(s) for the article can be chosen. If either the layout application software unit 44 is not being used (e.g., the manager in FIG. 1), or the layout application software unit 44 is being used but not with a layout from which the layout area(s) for the article can be chosen, then, in step 904, a runtime flag, the "send_pictures" flag, is set indicating that no page pictures are to be sent to the writer/editor with the article file 304 of the article to be assigned. Subsequently, in step 908 a dialog box is presented to the user on his/her desktop publishing device 120 display allowing him/her to enter the name of the writer/editor to whom the article is being assigned, the date and time by which the article is to be completed, the length and width of the publication area(s) to be filled (if known) and the section of the publication where the article is to be published. Once this information has been input and stored on the user's desktop publishing device 120, in step 912 an article file 304 is created as will be described with reference to FIG. 12.

Alternatively, if the result from the decision in step 900 is yes, then a layout designer is using the layout application software unit 44 with a publication layout from which a layout area(s) in which to publish the article can be chosen. In step 916 the article assignment unit 40 waits for the layout designer to choose a layout area(s) where the new article is to be published. Preferably, the perimeter or geometry of each layout area is a closed polygon. Thus, each layout area can be described by a series of 2-dimensional page coordinates designating, in sequence, for example, counter-clockwise about the polygon, the vertices of the layout area's geometry. Therefore, for each layout area chosen, a page designation and a list of vertex coordinates specifying the layout area's geometry are stored on the designer's desktop publishing device 120. After all layout areas for the article to be assigned have been chosen, in step 920 the article assignment box used in step 908 is presented to the designer to be filled in substantially as in step 908 but with the additional option that the designer can also specify that page pictures should also be sent with the article file 304 to be created for the assigned article. Preferably the designer has the option of specifying that no page pictures be sent with the newly assigned article's file 304, or that the page pictures be sent for all of the pages on which the article is to appear, or when there is a data storage device 108 constraint and/or when the only surrounding page information of interest resides on the first page containing the article (e.g., in newspapers), that only the first page picture for the article be sent. Further, the designer can specify whether the page picture(s) are to be black and white or color.

Once the designer has input all the above specifications and they have been forwarded to the article assignment unit 40, in step 924 a determination is made as to whether any page picture(s) are to be sent to the writer/editor with the article file 304. If no page pictures are to be sent, then in step 928 the send_pictures flag is set to indicate that no page pictures are to be sent with the article file 304. Alternatively, if there are page pictures to be sent, then in step 932 a determination is made as to whether or not page pictures for all pages containing portions of the article are to have their page pictures sent to the writer/editor with the article file 304. If no, then in step 936 the send_pictures flag is set to indicate that only the first page on which the article is to reside should have a page picture sent with the article file 304. Alternatively, if all page pictures are to be sent, then in step 940 the send_pictures flag is set to indicate that page pictures for all pages containing a portion of the article are to be sent to the writer/editor. Regardless of the decision branch from step 932, step 944 is encountered where a flag, denoted the "color" flag, is set to indicate whether the user chose for the page pictures to be color or black and white. Subsequently, regardless of the path of steps executed from step 900, step 912 is encountered where the article file 304 is initialized so that any desired page pictures can be sent to the writer/editor.

In creating the article file 304 for the newly assigned article, any desired page pictures must be stored and related to the article file 304. Preferably, these page pictures are written into the article file thus assuring they are transferred to the writer/editor when the article text is requested. Therefore, in describing the steps of FIG. 12 for implementing the step 912 of FIG. 11, the creating and storing of page pictures is also described.

Referring to FIG. 12, in step 1000 the article assignment unit 40 requests that the publication coordinator 24 create a new article file 304 file name and return this file name and the location where the new article file is to reside. When the new article file 304 information is received, the file is created and opened for writing. In decision step 1004 a determination is made as to whether layout areas were chosen for the assigned article. The default for this decision is "no" unless information output by the layout application software unit 44 indicates otherwise. If no layout areas were chosen, then in step 1008 information is written into the new article file 304 indicating that no geometry and no page pictures are included. Subsequently, in step 1012 the content area 312 of the article file 304 is initialized indicating there is currently no text for the article. In step 1016 the item file header 308 is initialized. In step 1020 the article file 304 is closed. In step 1024 the article file 304 is registered with the data controller 32 by initializing a file summary record 420 and an item header record 378 for the article file 304. Thus, the reference field 428 of the file summary record 420 is initialized to reference the article's item header record 378 while the headeruser field 432 and the usemode field 436 are initialized to indicate that the item header record 378 is not being accessed. In addition, the reference fields 440 and 444 are set to predetermined values indicating no references are available. Further, note that the item header record 378 (and the item file header 308) are initialized to indicate the article file 304 is not checked-out, but that it has been assigned.

Referring again to step 1004, if layout areas were chosen for the assigned article, then the loop consisting of the steps 1028–1076 is executed. Each iteration of this loop examines one page of the layout whereby the page contains a layout area chosen to contain a portion of the text of the newly assigned article. This loop, in steps 1028–1068, writes any page picture information required for the page into the article file 304. Subsequently in step 1072, the geometry for each layout area chosen for the article on the page is written to the article file 304.

The steps 1028–1076 are now described. In step 1028, each successive layout page, starting with the first such page, having a layout area on which the new article is to reside is fixed for the next execution of the steps through step 1076. This implies, of course, that the article assignment unit 40 has gained access to the layout information. Preferably, this information is conveyed to the article assignment unit 40 via the layout application software unit 44. In step 1032 a determination is made as to whether a page picture for the current page should be written to the article file 304. The determination here depends on the value given the send_pictures flag in FIG. 11. Thus, the "no" branch from step 1032 is always taken if no page pictures are to be sent to the writer/editor. The "yes" branch from step 1032 is always taken if page pictures for all pages are to be sent to the writer/editor. Alternatively, the "yes" branch is only taken on the first page if the send_pictures flag indicates this. When the "no" branch from step 1032 is taken, then step 1036 is executed. This step writes a designation into the article file 304 indicating that no page picture is included. Subsequently, in step 1072, the geometry of the page layout area(s) chosen for the article is written to article file 304. Thereafter, in step 1076, a determination is made as to whether there are further layout pages having a layout area chosen for the article. It is worthwhile to mention that the layout application software unit 44 preferably retains or stores information linking together the layout areas for each article. In particular, the article layout areas on each page are linked together in the order of the article text flow, i.e, a first layout area is followed by a second layout area whenever the text for the first layout area precedes the text of the second layout area. In addition, each of the layout pages for an assigned article is also linked together in the order of the article text flow. Thus, if the current page provides a link to a succeeding page of the layout then from step 1076, step 1028 is again encountered and another iteration of the loop (i.e., steps 1028–1076) is executed.

Returning now to decision step 1032, if the "yes" branch is taken then a page picture for the current page is to be included in the article file 304. In step 1040, a blank page picture is created. That is, a blank bit map is created for the current page. In the loop consisting of steps 1048–1064, each layout area on the page is examined to determine whether or not the layout area was chosen to contain text of the new article. If not chosen, then the contents (if any) of the layout area is drawn on the page picture. Otherwise, if chosen, then blanks are redrawn in the layout area. Therefore, a page picture is constructed that can serve as a background bit map on the display of the writer/editor's desktop publishing device 120. The layout areas where the assigned article is to be placed will have a blank background upon which the text to be entered for the article can be viewed while the remainder of the display presents a picture of the surrounding portions of the page.

In describing in more detail the loop consisting of the steps 1048–1064, note that the loop presupposes that the layout application software unit 44 orders the layout areas for the page in a back-to-front ordering. That is, since each layout area can overlap other layout areas, the layout areas are ordered so that whenever a first layout area is (partially) occluded by a second layout area, then the first layout area must precede the second layout area in the ordering. Thus, for each execution of step 1048, the current layout area assigned to the variable "layout_area," has been preceded by layout_area assignments to all layout areas that are occluded by the current layout area assigned to layout_area. In step 1052, a determination is made as to whether the current layout area was chosen to contain text of the newly assigned article. If not, then in step 1056, using the geometry of this layout area, the contents (if any) of the current layout area in "layout_area" is drawn on the page picture bit map in the same size and orientation as if the boundaries of the page picture were the boundaries of the page of the publication. Further, note that the drawing is done in either a black and white or a color encoding, depending on the value of the color flag set in step 944 of FIG. 11. Alternatively, in step 1060, if the layout area in "layout_area" was chosen to contain text for the new article, then blanks are drawn on the area of the bit map corresponding to the geometry of this layout area. subsequently, in step 1064, a determination is made as to whether there are more layout areas to be examined and drawn for the current page.

When a user (e.g., writer/editor) requests an article for editing or reading only, the article retrieval unit 56 is activated by the user interface 60 to retrieve a copy of the article's file 304 from the publication coordinator 24. If the user has indicated that the article is to be edited, then its article file 304 is checked-out. Otherwise, a read only copy of the article file 304 is made on the user's desktop publishing device 120. It is worth mentioning that substantially no read only requests are denied to a publication item file 304 since no such file is unavailable for reading for any lengthy time (e.g., minutes). Once a copy of any article file 304 has been obtained, the article text editing unit 52 invokes the display formatter 68 to display any text in the content area 312 in one of the three formats: WYSIWYG, Galley and full screen.

Referring now to FIG. 13, a flowchart is presented of the program used by the display formatter 68 to display an article file 304. In step 1100, the display formatter 68 uses at least one text WYSIWYG descriptor(s) in the content area 312 to determine where every text character of the article's previously written text is to be positioned. Such text descriptors are well known in the art and include the following text attributes: font, font size, kerning, track, color and leading. Note that, whenever such attributes change in the text, a new text descriptor is embedded within the text of the content area 312 to indicate the change. In step 1104, a determination is made as to whether the article is to be displayed in WYSIWYG format. When an article is initially displayed, it is always displayed in WYSIWYG format. Following such an initial display, the user can switch from any one of three display formats to any other display format via step 1188 as will be described shortly. Thus, as can be seen, the steps 1104 through 1188 constitute a loop. The steps 1108 through 1120 describe the article display in WYSIWYG format while the steps 1124 through 1180 describe the article display in Galley and full screen format.

If the article is to be displayed in WYSIWYG format, then, in step 1106, a flag(s) is set to use the WYSIWYG text descriptor(s) residing in the article file 304 and ignore any Galley and full screen text descriptors set at the user's desktop publishing device 120. Thereafter, in step 1108, a determination is made as to what portion of the page(s) containing the article is to be drawn on the display. To make this determination, the user interface 60 supports conventional vertical and horizontal scroll bars and a scale or zoom function on the user display allowing the user to easily vary the displayable portion of the article's page(s), preferably via a mouse and/or a keyboard. As is well known in the art, display window scroll and zoom features have values corresponding to these features stored on the user's device 120 such that the values can be used to determine the displayable area within the page(s) of the article. However, note that during the initial display of an article, the scroll parameters are set such that the text of the first page of the article fills the article's display window. Further, note that during the initial display after a change in the display format, the scroll and zoom parameters are set, preferably, such that the position designating the most recent editable location (e.g., cursor location) is visible. In step 1112, a determination is made as to whether page pictures are to be displayed. If no geometry resides in the geometry area 316 of the article file, then no page pictures will be available. In this case, a default page size is used to display only the article text (if any). Alternatively, if the article's geometry is included in the article file 304, but no page pictures are available, then the article is displayed in its layout area(s), however, the remainder of the page(s) is blank. If the geometry and additionally the page pictures reside in the article file 304, then whenever an article is initially displayed, the page picture of the first page is automatically displayed with the article's text (if any) being displayed in its layout areas. Thereafter, at the user's option, the page pictures can be blanked. That is, on all subsequent WYSIWYG redisplays of the article, a variable indicating the user's preference regarding the display of page pictures is inspected to determine whether or not to display the page pictures. Thus, after any display of the page pictures, step 1116 is encountered. In this step, the layout areas for the article are displayed by drawing a border around the currently displayable article layout areas and optionally changing the background color for these areas. In step 1120, the article's text (if any) is drawn in the layout areas in the same manner as it would appear on the published page(s), thus completing the WYSIWYG display.

Subsequently, in step 1184, the user display options are enabled. Such options include at least:

(9.1) allowing the user to blank the page picture in WYSIWYG format;

(9.2) allowing the user to change between any of the display formats; and (9.3) allowing the user, regardless of the display format, to view other pages or lines of the article's text by assuring that scrolling and, if using WYSIWYG format, also zooming are enabled.

In step 1188, the display formatter 68 goes into a wait state, blocking until a display change command is input by the user. Such commands include the commands corresponding to (9.1), (9.2) and (9.3). When such a command is received, step 1104 is once again executed.

Referring again to step 1104, if WYSIWYG format is not to be used, then either Galley or full screen text format is used in displaying the article. In step 1124, the scroll parameter values are used to determine which text line will be the first or uppermost text line displayed on the display window. As noted above, for the initial display, the scroll parameters are set such that the text of the first page of the article fills the article's display window. However, subsequently, whenever any of the formats are being entered for the first time or re-entered from another format (via step 1188), the scroll parameters are reset such that the position designating the most recent editable location is visible. However, if the user inputs a scroll command via step 1188, then the new scroll parameters are used here to calculate the new displayable first text line in a conventional manner well known in the art. Subsequently, in step 1128, the Galley and full screen text descriptor is activated for use in displaying the text and a flag(s) is set to ignore the WYSIWYG descriptors in the article file 304. As its name implies, the Galley and full screen text descriptor is applicable to both the Galley and full screen formats. This descriptor includes at least a font type field and a font size field, both fields being user setable. In step 1132, a determination is made as to whether the user has requested the text be displayed in Galley or full screen format. If full screen format is requested, then, in step 1136, starting with the first (i.e., uppermost) text line of the display window, the maximum number of words (with any trailing punctuation) that can be displayed on this line is determined. Subsequently, in step 1176, this text line is drawn on the display window. In step 1180, a determination is made as to whether there is room on the display window for (a portion of) another text line. If so, then step 1132 is again executed and the full screen branch is again taken to step 1136 to determine the maximum number of words that can be displayed on the next lower text line of the display window. In step 1176, this text line is drawn using the Galley and full screen text descriptor and step 1180 is encountered. The loop of steps 1132, 1136, 1176 and 1180 is executed until the text display window is filled with text. Once this occurs, step 1184 is encountered where the user display options are assured to be enabled and, in step 1188, the display formatter 68 again blocks until a display change command is entered.

Returning again to step 1132, if the user requests the article's text to be displayed in Galley format, then an alternative loop consisting of the steps 1132 and 1140 through 1180 is executed with each iteration of the loop causing a single Galley formatted text line to be drawn on the display window. Thus, to describe the Galley format display of a text line, steps 1140 through 1176 will be discussed. In step 1140, the next line of text, as designated in WYSIWYG format, that can be drawn on the display window is calculated. Note that this text line will be drawn using the Galley and full screen text descriptor on a single Galley text line of the display window regardless of what portion of the text line is displayable since the horizontal scrolling capability may be used to view the entire line. Further, note that each new Galley text line determined in step 1140 will be drawn starting at the beginning of the next display line. In steps 1144 through 1168, one of three indicators can be drawn immediately below a Galley text line. The indicators are:

(10.1) a solid thick horizontal line indicating the end of the geometry. That is, the text line immediately above the end of geometry indicator is the last text line that will fit into the article's assigned layout areas;

(10.2) a line of tightly packed dots indicating the end of the layout area for the current layout area. That is, the text line immediately above the end of layout area indicator is the last text line that will fit into the layout area to which it is to be drawn; and (10.3) a line of sparsely packed dots indicating the end of the column for the current layout area. That is, the text line immediately above the end of column indicator is the last text line that can be drawn into the column of text.

Since the end of the geometry also implies the end of a layout area and the end of a layout area also implies the end of a column, only the most encompassing "end of" indicator is drawn. Thus, in steps 1144 and 1148, if the end of geometry is encountered, then only the end of geometry indicator is drawn. Similarly, if the end of the geometry has not been reached, but the test for the end of a layout area is affirmative in step 1156, then, in step 1160 an end of layout area indicator is drawn. If the end of a layout area has not been reached, then in steps 1164 and 1168, the end of column condition is tested and the end of column indicator is drawn if the test is affirmative. Subsequently, regardless of the execution path taken from step 1140, step 1172 is encountered and the line number for the text line determined in step 1140 is calculated and drawn in the left margin of the line. Then, in step 1176, the text line is drawn, thus completing an iteration of the Galley format text line drawing loop.

It should, however, be noted that another feature of the Galley format implementation is that, once the end of geometry indicator has been drawn in step 1148, the step 1152 sets a "beyond end of geometry" indicator for each text line succeeding the end of geometry indicator so that the user can easily see which text lines cannot be fitted into the article's layout areas. Preferably, the beyond end of geometry indicator is a gray background bitmap in the portion of the display window where the text line numbers are drawn in step 1176.

Figure 14:
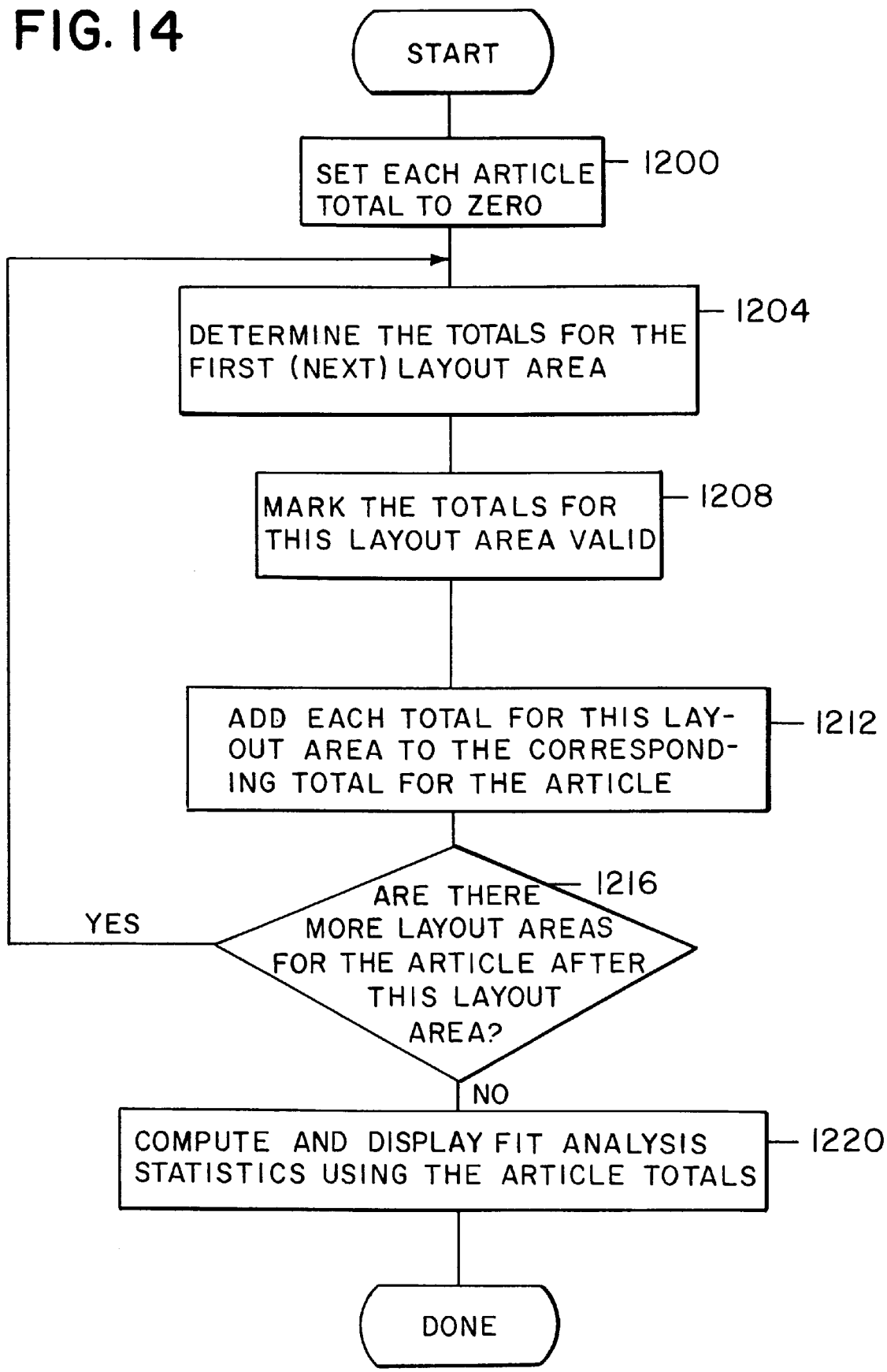
FIG. 14 is a flowchart describing the steps executed when initializing the dynamic analysis fit unit 72.
Figure 15:
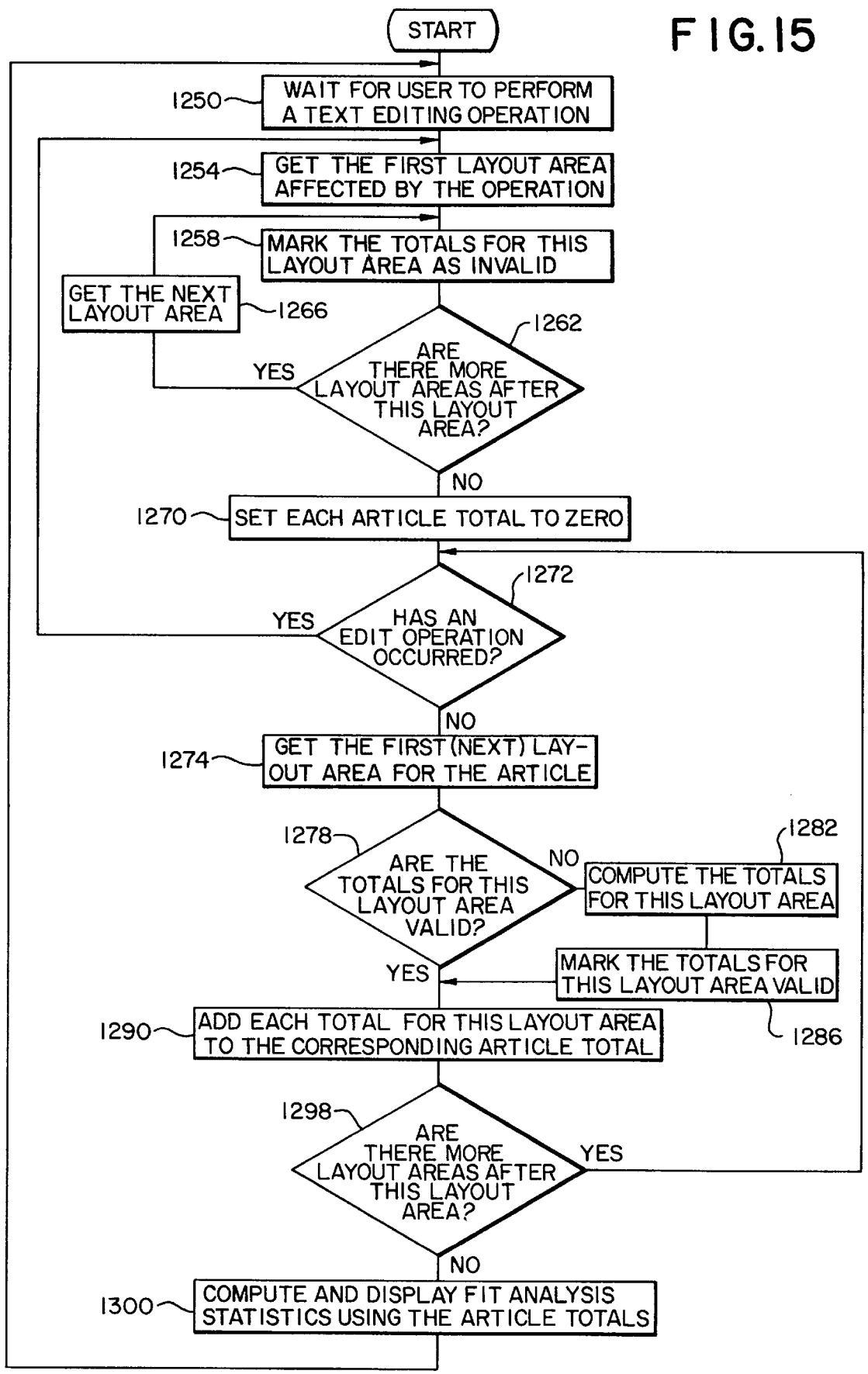
FIG. 15 is a flowchart describing the steps executed when automatically updating the fit statistics during a text editing session.

In FIGS. 14 and 15, the flowcharts for the programs used by the dynamic fit analysis unit 72 are presented. This unit provides the user with the ability to display substantially continually updated statistics on an article's size or length as well as measurements of how the article fits within its assigned layout areas. In particular, the user interface 60 provides the user with the ability to display for a given article the following statistics:

(11.1) the total number of words currently in the article;

(11.2) the number of text lines currently in the article;

(11.3) the length or equivalently the depth of the text of the article in inches or centimeters;

(11.4) the depth of the article that is under or over the article's total assigned layout area depth. Thus, for example, this statistic can be calculated by subtracting the depth of the article's assigned layout area(s) from the current depth of the article's text; and (11.5) the number of text lines under or over the total number of text lines that can be written to the article's assigned layout area(s). Thus, for example, this statistic can be calculated by adding together the height of the font size used for the last character of the article and the height of the leading below this character then dividing the resulting sum into the result of the depth of the article minus the depth of the article's assigned layout area(s).

More precisely, the user interface 60 always displays the number of words in an article and, in addition, allows the user to simultaneously display any two of the other statistics (11.2) through (11.5).

FIG. 14 describes the steps taken to display the initial fit statistics when an article file 304 is first displayed. FIG. 15 describes the steps taken to update and display these statistics dynamically and automatically while the user is entering text editing commands.

Referring now to FIG. 14, in step 1200, each variable in a collection of article totals is set to zero. The totals are used in calculating (11.1) through (11.5). Thus, the article totals include: a variable for storing the total number of article words, and a variable for storing the total number of text lines in the article and a variable for storing the depth of the article's text. In step 1204, three corresponding totals are computed for the first layout area for the article. It is important to note that related to each of the article's layout areas are variables for storing totals corresponding to the article totals. That is, for each such layout area, there is a total number of words variable, a total number of text lines variable, and a variable for the total depth of text in the layout area. In step 1208, the totals for the first of the article's layout areas is marked valid. This is preferably accomplished by setting a bit, denoted the "validity bit," related to the layout area. Each article layout area has such a bit for marking or indicating whether or not the totals in the layout area are correct. In step 1212, each total obtained for the current, i.e. the first, layout area is added to its corresponding article total. In step 1216, a determination is made as to whether there is a succeeding layout area for the article with respect to the text flow ordering of the article's layout areas. If yes, then the loop consisting of the steps 1204 through 1216 are re-executed with the article's next layout area. Thus, when the no branch of step 1216 is taken, the article totals have been correctly initialized. Finally, in step 1220, the total number of article words plus, at the user's option, any two of the statistics (11.2) through (11.5) are computed and subsequently displayed by the user interface 60.

Referring now to FIG. 15, the flowchart describing the steps performed to dynamically and automatically update the fit analysis statistics are presented. The flowchart consists of an outer loop having all flowchart steps, i.e., steps 1250 through 1300. This loop waits for the completion of a text editing operation in step 1250, then updates the article totals in steps 1254 through 1298, and subsequently computes and displays the statistics in step 1300. In the inner loop consisting of the steps 1254 through 1266, all layout areas potentially affected by a text editing command are marked invalid by unsetting the validity bit for each such layout area. That is, the first layout area of the article affected by the editing operation and all succeeding layout areas with regard to the text flow ordering are marked invalid. In step 1270, each of the article totals is set to zero in preparation for the totals being recalculated. In the loop consisting of the steps 1272 through 1298, each of the article's layout area totals and the article totals are updated. Ignoring step 1272 for the moment, the initial execution of step 1274 yields a reference to the first layout area for the article. In step 1278, a determination is made as to whether the totals for this layout area are valid by examining the validity bit. If the totals are invalid, then the totals for this layout area are recomputed in step 1282 and, subsequently, the validity bit for this layout area is reset in step 1286. Thus, regardless of the branch taken from step 1278, step 1290 is encountered and the currently referenced layout area has valid totals. Thus, step 1290 adds each layout area total for the currently referenced layout area to its corresponding article total. In step 1298, a determination is made as to whether there are further layout areas after the currently referenced layout area. If so, then (ignoring step 1272) step 1274 is again executed causing the next of the article's layout areas to be referenced. Subsequently, the totals for this layout area are assured valid and also added to the article totals in step 1290. Thus, when the no branch of step 1298 is taken, the article totals are current, thus reflecting any text changes due to the text editing operation causing the dynamic fit analysis unit 72 to be activated from step 1250.

It is important to note, however, that the time to complete the above described steps of FIG. 15 depends on the number of layout areas as well as the size of the article's text beyond where the activated text editing operation occurred. Thus, when a user is rapidly entering text, particularly near the beginning of a large article, the new statistics cannot be successfully calculated between each keystroke without causing an unacceptably slow article text editing unit 52 response to user input in at least the echoing on the display window of each keystroke. Furthermore, the user is unlikely to examine updated fit statistics between keystrokes of continuously entered text. Thus, the step 1292 has been advantageously incorporated into FIG. 15 to alleviate this difficulty. Since, typically, substantially all the time spent in executing the flowchart of FIG. 15 is spent in the loop consisting of the steps 1274 through 1298 described immediately above, step 1292 allows this loop to be exited prior to updating each of the layout area totals and the article totals. The exit occurs whenever another text editing operation is detected. Thus, for example, the yes branch of step 1292 will be taken between any two rapidly entered editing operations such as entering characters or deleting characters. Subsequently, step 1254 is encountered and the fit statistics updating process recommences. Eventually, the user will pause in editing the text. During the pause, all layout area and article totals will be updated by continually taking the no branch of step 1292 and the updated fit statistics will be computed and displayed in step 1300.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or other embodiments, and with the various modifications required by their particular application or uses of the invention. It is intended that the appended claims be construed to include alternative embodiments to the extent permitted by the prior art.

What is claimed is:

1. Publication system apparatus for coordinating access to a publication item that is stored in said publication system, comprising:

means for storing data that comprises a publication item, including at least one of article text, image data and layout data, comprising;

means for storing publication item file name data for identifying said publication item data; and means for storing publication item file name data for identifying said publication item data; and means for storing user identification data for identifying primary users that are authorized to access and modify said publication item data;

means for storing publication status data that defines control attributes of said publication item data; and means for coordinating separate simultaneous access to each of said publication item data and said publication status data among a plurality of users wherein at least two of said plurality of users simultaneously access said article text, image data and layout data of a publication item, comprising:

means for storing a plurality of the following:
publication identification data indicative of a name of a publication, user access data that defines the identity of all users having access to said publication item data,
publication item location path data identifying a storage area in a memory of said publication system where said publication item data is stored,
header location data that defines the location of an item header within a file related to said publication data,
item header data that is a copy of a header contained in said publication item,
file header format data that defines a format of said item header record of said publication item, and
a watch record that defines at least one predetermined activity relating to said publication data.

2. The apparatus of claim 1, wherein said means for coordinating comprises:

means for storing data comprising at least one of the following: a configuration file containing data for initializing said publication system apparatus, a plurality of publication item files with each of said publication item files associated with an item to be published and a plurality of header format files with each of said header format files for interpreting file header information residing in each of said plurality of publication item files.

3. The apparatus of claim 1, wherein said publication system comprises a plurality of user workstations, said means for coordinating comprises:

file server means for storing a plurality of publication item data;

publication access controller, each of said plurality of user workstations being able to directly access said publication access controller for obtaining publication status data of said publication item data but not being able to directly access said file server means to obtain access to said publication item data, unless said publication access controller first grants access to said file sever means for obtaining said publication item data.

4. The apparatus of claim 1, wherein said means for coordinating cmprises:

means, responsive to data input by a user, for generating a watch record that defines at least one predetermined activity relating to said publication data, wherein said one predetermined activity includes at least one of the following: a change to said publication status data, a chance to said publication item data, a check-in or a check-out of said publication item data, a change in status related to a query of said publication item inputted by a user, and said publication item data is checked-out for exclusive editing of text by a requestor and a change to said layout data occurs by a user different from said requestor; and means, responsive to the occurrence of said at least one predetermined activity, for transmitting an indication to said user that said at least one predetermined activity has occurred.

5. The apparatus of claim 4, wherein said watch record comprises a plurality of the following:

a watch record identification field having information that identifies each watch record, a bit string field in which substantially each bit represents a predetermined event related to said publication item data for which notification is generated, a user identification field for storing the identification of a user requesting notification whenever said predetermined event occurs, a reference field having information related to a stored query, and a reference field linking together a plurality of watch records related to said publication item data.

6. The apparatus of claim 1, wherein said means for coordinating comprises:

dynamic fit analysis means for dynamically displaying information relating to at least one of the following: the total number of words in an article, the total number of lines in an article, the total depth of an articles, and a magnitude relating to the difference between a current depth or number of lines having text and an allocated depth or number of lines, wherein said magnitude information is continuously provided to a user editing said publication item data.

7. The apparatus of claim 1, wherein said means for coordinating comprises:

means for limiting a user's ability to modify said publication item data while permitting viewing of said article text of said publication item data by such a user on an output device.

8. The apparatus of claim 1, wherein said means for coordinating comprises:

means for allowing a user to assign a publication item for writing and to input information related to said publication item.

9. The apparatus of claim 8, wherein said means for coordinating access further comprises:

text editing means for creating and modifying said article text of said publication data.

10. The apparatus of claim 9, wherein said text editing means comprises:

article text retrieval means for checking out for exclusive use by a selected user said article text of said publication item data.

11. In a publication system, a method for coordinating access to a publication item that is stored in said publication system, comprising the steps of:

storing data that comprises a publication item, including at least one of: article text, image data and layout data, comprising;

storing publication item file name data for identifying said publication item data;

storing user identification data for identifying primary users that are authorized to access and modify said publication item data;

storing publication status data that defines control attributes of said publication item data; and coordinating separate simultaneous access to each of said publication item data and said publication status data among a plurality of users wherein at least two of said plurality of users simultaneously access said article text, image data and layout data of a publication item, comprising;

storing a plurality of the following:

publication identification data indicative of a name of a publication, user access data that defines the identity of all users having access to said publication item data, publication item location path data identifying a storage area in a memory of said publication system where said publication item data is stored, header location data that defines the location of an item header within a file related to said publication data, item header data that is a copy of a header contained in said publication item, file header format data that defines a format of said item header record of said publication item, and a watch record that defines at least one predetermined activity relating to said publication data.

12. The method of claim 11, wherein said step of coordinating comprises;

storing data comprising at least one of the following: a configuration file containing data for initializing said publication system apparatus, a plurality of publication item files with each of said publication item files associated with an item to be published and a plurality of header format files with each of said header format files for interpreting file header information residing in each of said plurality of publication item files.

13. The method of claim 11, wherein said step of coordinating comprises:

limiting a user's ability to modify said publication item data while permitting viewing of said article text of said publication item data by such a user on an output device.

14. The method of claim 11, wherein said publication system comprises a plurality of user workstations, said step of coordinating comprises:

storing in a file server a plurality of publication item data;

enabling each of said plurality of user workstations to directly access a publication access controller to obtain publication status data of said publication item data but not being able to directly access said file server to obtain access to said publication item data, unless said publication access controller first grants access to said file sever to obtain said publication item data.

15. The method of claim 11, wherein said step of coordinating comprises:

dynamically displaying information relating to at least one of the following:

the total number of words in an article, the total number of lines in an article, the total depth of an article, and a magnitude relating to the difference between a current depth or number of lines having text and an allocated depth or number of lines, wherein said magnitude information is continuously provided to a user editing said publication item data.

16. The method of claim 11, wherein said step of coordinating comprises:

generating, in response to data input by a user, a watch record that defines at least one predetermined activity relating to said publication data, wherein said one predetermined activity includes at least one of the following: a change to said publication status data, a change to said publication item data, a check-in or a check-out of said publication item data, a change in status related to a query of said publication item inputted by a user, and said publication item data is checked-out for exclusive editing of text by a requestor and a change to said layout data occurs by user different from said requestor; and transmitting, in response to the occurrence of said at least one predetermined activity, an indication to said user that said at least one predetermined activity has occurred.

17. The method of claim 16, wherein said watch record comprises a plurality of the following:

a watch record identification field having information that identifies each watch record, a bit string field in which substantially each bit represents a predetermined event related to said publication item data for which notification is generated, a user identification field for storing the identification of a user requesting notification whenever said predetermined event occurs, a reference field having information related to a stored query, and a reference field linking together a plurality of watch records related to said publication item data.

18. The method of claim 11, wherein said step of coordinating comprises:

allowing a user to assign a publication item for writing and to input information related to said publication item.

19. The method of claim 18, wherein said step of coordinating access further comprises:

text editing to create and modify said article text of said publication data.

20. The method of claim 19, wherein said text editing comprises:

checking out for exclusive use by a selected user said article text of said publication item data.

* * * * *